US008721446B2

(12) United States Patent
Lee et al.

(10) Patent No.: US 8,721,446 B2
(45) Date of Patent: May 13, 2014

(54) BACKGROUND DOWNLOADING OF GAMING CONTENT TO A GAMING MACHINE PRIOR TO A SCHEDULED SHUTDOWN

(75) Inventors: Steven Lee, Naperville, IL (US); Craig J. Sylla, Round Lake, IL (US); James E. Sutton, Cary, IL (US); Faith LeBrun, Chicago, IL (US); Jerome Carpenter, Woodridge, IL (US)

(73) Assignee: WMS Gaming Inc., Waukegan, IL (US)

( * ) Notice: Subject to any disclaimer, the term of this patent is extended or adjusted under 35 U.S.C. 154(b) by 1050 days.

(21) Appl. No.: 11/275,082

(22) Filed: Dec. 8, 2005

(65) Prior Publication Data

US 2006/0160622 A1 Jul. 20, 2006

Related U.S. Application Data

(60) Provisional application No. 60/634,676, filed on Dec. 9, 2004, provisional application No. 60/700,146, filed on Jul. 18, 2005.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |

(52) U.S. Cl.

USPC .......... 463/42

(58) Field of Classification Search

USPC .......... 463/42

See application file for complete search history.

(56) References Cited

U.S. PATENT DOCUMENTS

| | | | | |
|---|---|---|---|---|
| 6,970,698 | B2 * | 11/2005 | Majmundar et al. | 455/419 |
| 7,685,253 | B1 * | 3/2010 | Valia | 709/217 |
| 2005/0153778 | A1 * | 7/2005 | Nelson et al. | 463/42 |
| 2005/0261062 | A1 * | 11/2005 | Lewin et al. | 463/42 |

FOREIGN PATENT DOCUMENTS

WO WO 2004114639 A1 * 12/2004

OTHER PUBLICATIONS

Bharat Kumar, "India: Don't restart, resume a download", Businessline, Dec. 25, 1999, p. 1.*

* cited by examiner

*Primary Examiner* — Milap Shah
*Assistant Examiner* — Jason Pinheiro
(74) *Attorney, Agent, or Firm* — Nixon Peabody LLP

(57) ABSTRACT

Software is download to a gaming device as a background operation while the gaming application runs in the foreground. An authorization operation may be completed before the download operation to prevent unauthorized installation of software. New games, software updates, and advertising content can be downloaded to the gaming machine in a background operation.

19 Claims, 24 Drawing Sheets

BACKGROUND DOWNLOADING OF GAMING CONTENT TO A GAMING MACHINE PRIOR TO A SCHEDULED SHUTDOWN

RELATED APPLICATION

This application claims priority under 35 U.S.C. 119(e) from U.S. Provisional Application Ser. No. 60/634,676 filed Dec. 9, 2004, and from U.S. Provisional Application Ser. No. 60/700,146 filed Jul. 18, 2005 which applications are incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2005, WMS Gaming, Inc. All Rights Reserved.

FIELD

This patent application pertains generally to gaming devices, gaming content distribution, and more particularly to downloading software to a gaming device.

BACKGROUND

Wagering game makers continually provide new and entertaining games. One way of increasing entertainment value associated with casino-style wagering games (e.g., video slots, video poker, video blackjack, and the like) includes offering a variety of base games and bonus events. However, despite the variety of base games and bonus events, players often lose interest in repetitive gaming content. In order to maintain player interest, wagering game machine makers frequently update gaming machine content with new game themes, game settings, bonus events, game software, and other electronic data.

When deploying new gaming content to gaming machines in the field, gaming machine operators typically manually deliver the content to each gaming machine. For example, when deploying new gaming content, an operator typically replaces existing media (e.g., ROM, CD-ROM, or flash RAM) with new media containing updated gaming content. For gaming machine operators owning scores of machines, this process can be relatively laborious and expensive.

SUMMARY

System and method embodiments for downloading gaming content to a gaming machine is described herein. In one embodiment, the method includes selecting a gaming machine to which gaming content can be transmitted over a network. The method can also include selecting gaming content for transmission to the gaming machine and transmitting the selected content to the gaming machine for receipt while the gaming machine is conducting gaming operations.

One embodiment of the invention includes a tangible machine-readable medium including instructions which when executed by machine cause the machine to perform operations. The tangible machine-readable medium includes instructions for conducting a wagering game in a gaming machine; and receiving, over a network, gaming content in the gaming machine, the receiving occurring during conduction of the wagering game.

Another embodiment includes a method that includes selecting a gaming machine to which gaming content can be transmitted over a network; selecting gaming content for transmission to the gaming machine; and transmitting the selected content to the gaming machine for receipt while the gaming machine is conducting gaming operations.

Another embodiment includes a machine-assisted method. The method includes identifying through a network a gaming device connected to the network, the gaming device running a gaming application that is available for use by a patron; identifying through the network at least one software module running on the gaming device. The method also includes determining whether new software is available for the gaming device. If new software is available for the gaming device, determining whether the new software has been authorized for download to the gaming device and, if the new software has been authorized: authenticating an approved source from which new software can be downloaded; and downloading the new software to the gaming device in a background operation while the gaming application is available for use by a patron.

One other embodiment includes a gaming device. The gaming device includes a computer system including a central processing unit coupled to a memory circuit, a display device, and a storage medium, the storage medium embodying instructions for running a software application on the computer system that presents a game of chance to a patron, the application including an interface that is presented on the display device; and a network interface connected to a network; wherein the central processing unit presents runs the application while new software is downloaded to the computer system and saved on the storage medium.

BRIEF DESCRIPTION OF THE FIGURES

FIG. 7AA is a flow diagram illustrating operations for requesting that a gaming content source transmits selected gaming content to the gaming machine, according to example embodiments of the invention;

FIG. 8AA is a flow diagram illustrating operations for transmitting, in response to a transmission request, gaming content from a content source to a gaming machine, according to example embodiments of the invention

DETAILED DESCRIPTION

Methods and apparatus for downloading in the background of a gaming device are described herein. In the following description, numerous specific details are set forth. However, it is understood that embodiments of the invention may be practiced without these specific details. In other instances, well-known circuits, structures, and techniques have not been shown in detail in to avoid obscuring the understanding of this description. Note that in the description, references to "one embodiment" or "an embodiment" mean that the feature being referred to is included in at least one embodiment of the invention. Further, separate references to "one embodiment" in this description do no necessarily refer to the same embodiment; however, neither are such embodiments mutually exclusive, unless so stated and except as will be readily apparent to those of ordinary skill in the art. Thus, the invention described herein may include any variety of combinations and/or integrations of the embodiments described herein. Moreover, in this description, the phrase "exemplary embodiment" means that the embodiment being referred to serves as an example or illustration.

Software for new games, software updates, or advertising can be downloaded to a gaming device in a background operation. As used herein, a gaming device is an electronic machine that is primarily dedicated to the purpose of allowing a patron to pay to play a game of chance for which there is a possible payoff. Such machines are typically subject to government regulations and specific protocols, which must be taken into account in performing software downloads. As used herein, "gaming device" does not refer to a desktop or laptop computer on which a game of chance, such as an internet gambling application, could be played. "Gaming device" also does not refer to arcade-style games which allow patrons to play for entertainment, but do not offer a cash payoff.

A gaming device configuration can be examined by a software module to determine whether appropriate software downloads are available. Software can be downloaded to a gaming device in a background operation while the gaming device is available for use by a patron. A software download can be authenticated through a network communication and executed immediately or scheduled for a particular time. A software download can be delayed, for example, if there is insufficient time to complete the download before a scheduled device shutdown. Downloading in the background can allow for more optimal use of gaming devices, especially in jurisdictions where gaming devices be turned off for a portion of each day.

Figure 1:
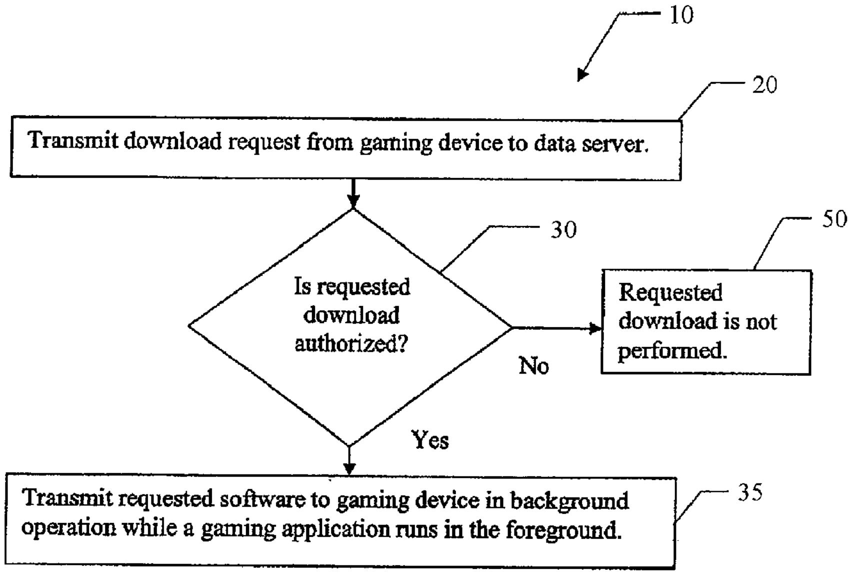
FIG. 1 is a flow chart that illustrates a process of downloading software to a gaming device in a background operation.

Referring now to FIG. 1, a software download operation 10 is illustrated in a flow chart. Request module 20 transmits a download request from a gaming device to a server. Authorization operation 30 checks whether the requested download is authorized. As used here, "authorized" means that the requested download conforms with regulatory requirements. "Authorized" can mean that explicit permission has been granted by a regulatory body, or can mean that the software conforms with applicable regulations for a particular jurisdiction. If the requested download has been authorized, data transmission module 35 transmits the requested data to a gaming device in a background operation while a gaming application runs in the foreground. The data can be, for example, software that runs a new game, updates to the software for an existing game, software for peripheral components (e.g., firmware), software that displays an advertisement or video, or an application that can run on the gaming device, such as automated teller (ATM) or kiosk application. If requested download is not authorized, the requested download is not performed 50.

Figure 1A:
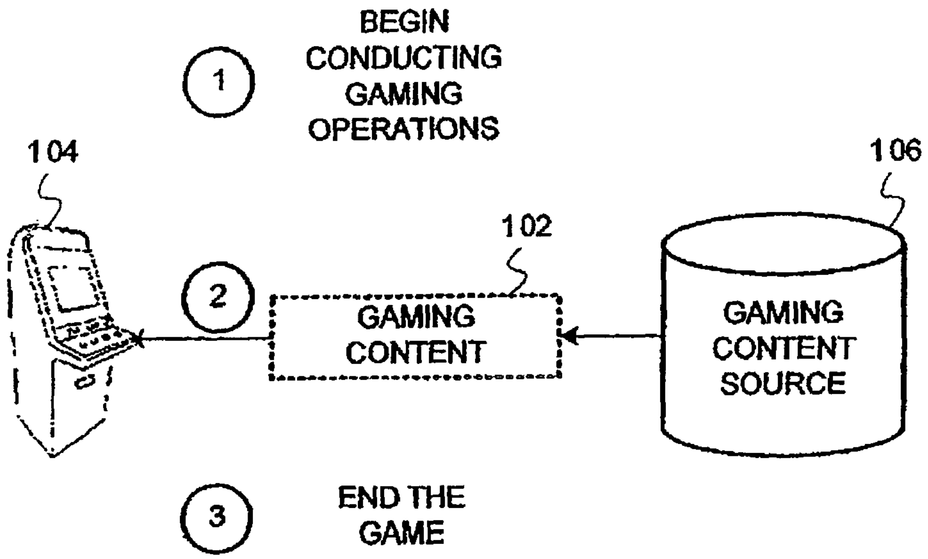
FIG. 1A is a dataflow diagram illustrating one embodiment of operations and data transmissions between a content source and a gaming machine.

One specific embodiment of a download operation illustrating data flow between a gaming content source and a gaming machine is shown in FIG. 1A. In FIG. 1A, the data transmissions occur over a network connection between a gaming content source 106 and a gaming machine 104. The gaming content source 106 includes gaming content (e.g., game themes, game settings, bonus events, game software, pay tables, and/or other electronic data) for electronic distribution to the gaming machine 104. In FIG. 1A, the operations and data flow occur in three stages.

At stage one, the gaming machine 104 begins conducting gaming operations. For example, the gaming machine 104 begins conducting a slots game. As another example, the gaming machine 104 could begin conducting operations for its "attract mode," which includes presenting media to attract game players.

At stage 2, the gaming content source 106 transmits gaming content to the gaming machine 104 while the gaming machine is conducting gaming operations. In one embodiment, the gaming machine 104 can perform gaming operations at the same time it receives and processes the gaming content 102. This capability allows gaming machine operators to update gaming machine content without taking the gaming machines out of service. As a result, gaming machines can continue producing income while they receive updated gaming content. In one embodiment of the invention, the gaming machine 104 can speed-up the download process by simultaneously receiving parts of the gaming content from a plurality of gaming content sources.

At stage three, the gaming machine 104 ends the gaming operations. For example, the game machine shuts-down or restarts with the new content.

In one embodiment, before the gaming machine 104 receives the gaming content 102, the gaming machine requests specific gaming content updates from the gaming content source 106. For example, the gaming machine 104 determines what gaming content is installed and requests updates relating to some or all of its installed gaming content. The gaming machine 104 can then receive the updates while performing gaming operations. This capability enables the gaming machine 104 to keep its installed gaming content up-to-date. The following sections will provide additional details about embodiments of the invention.

Figure 2:
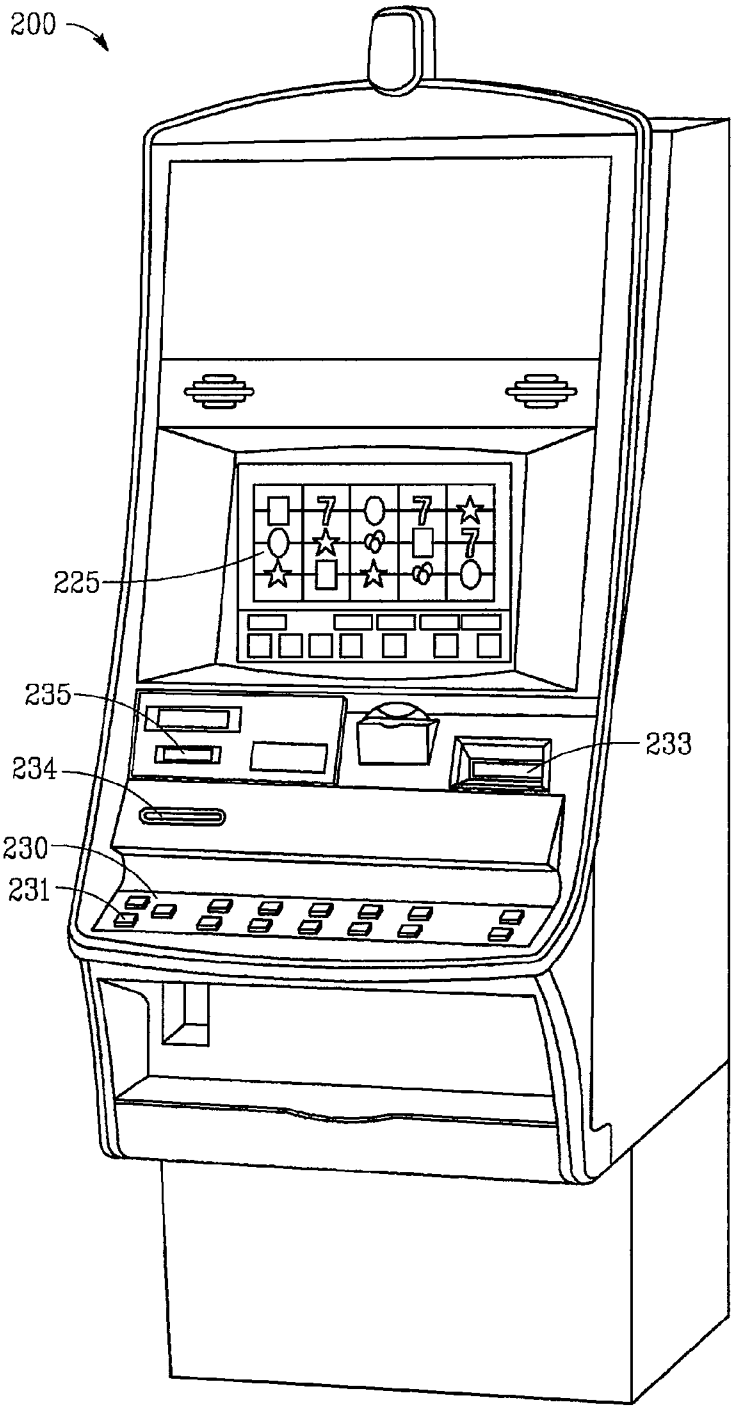
FIG. 2 is an illustration of a gaming device.

FIG. 2 shows an example of a gaming device 200. One or more central processing units (CPU's) (not shown) interact with a memory circuit, data storage, and a network interface to present a game of chance on a display 225. A patron can interact with the gaming device through an input mechanism 230 such as buttons 231. The input mechanism can also include a touch-sensitive screen, a lever arm, or other known input mechanisms. A gaming device typically can receive payment for game play through one or more of a bill collector 233, coin slot 235, or card slot 234. The device typically can provide a payoff in coin form or on a card.

Figure 3:
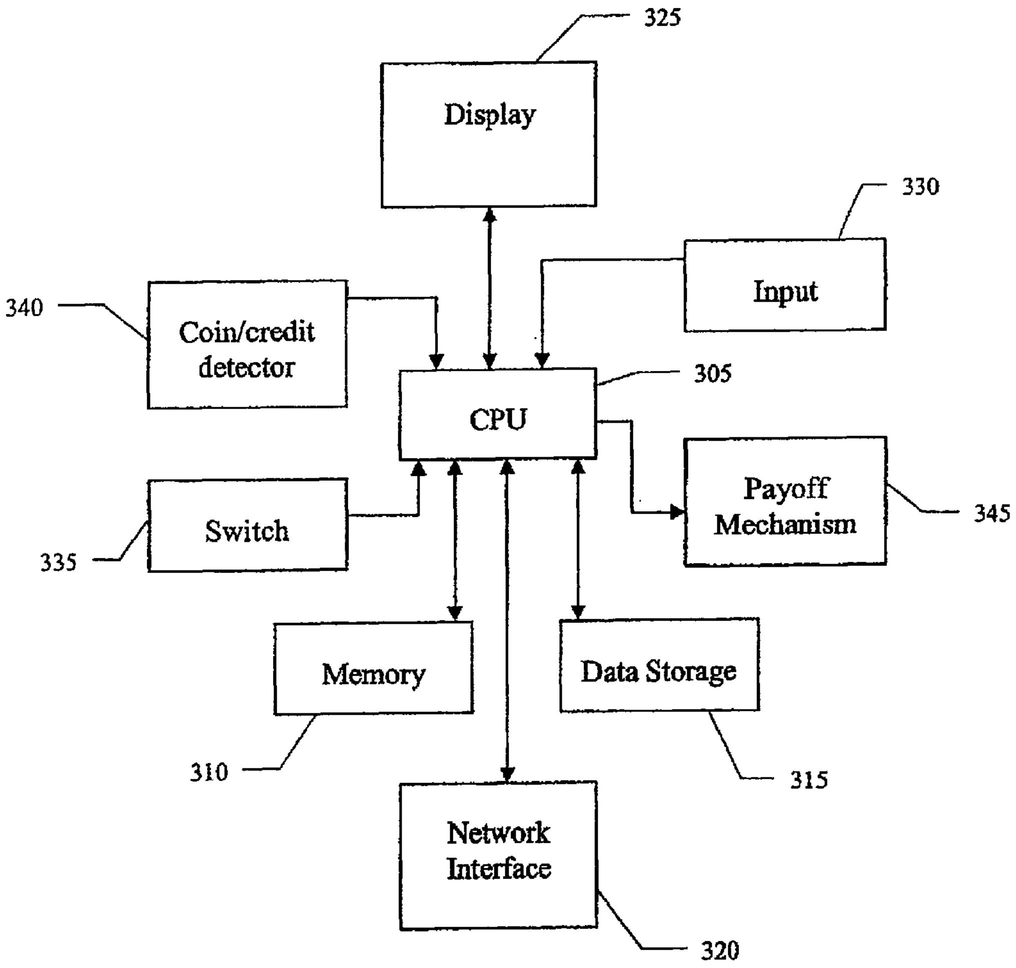
FIG. 3 is a schematic illustration of components of a gaming device.

FIG. 3 shows schematic representation of a gaming device system. A game can be played through a CPU 305 that is coupled to a memory circuit 310 and data storage 315 such as a hard drive. A network interface 320 allows the gaming device to interact with a server (not shown in FIG. 3) to coordinate multiple devices, for example, in a progressive jackpot environment. A display device 325 presents game choices and results to a patron. In varying embodiments, advertisements, entertainment, videos, or other content can also be presented on the display device. An input 330 such as a button system or touch-sensitive screen allows input from a game patron. A coin/credit detector 340 monitors receipt of payment for game play through coins, bills, cash-value cards, or credit cards. A payoff mechanism 345 can pay a gaming patron in coins, bills, and/or a cash-value card. A balance can also be maintained on an account associated with a tracking card. A switch 335 allows the device to be shut off. The devices shown in FIG. 3 can include firmware that is updatable through a software download. A variety of gaming device systems are possible, and it is understood that FIGS. 2 and 3 are merely examples.

Figure 4:
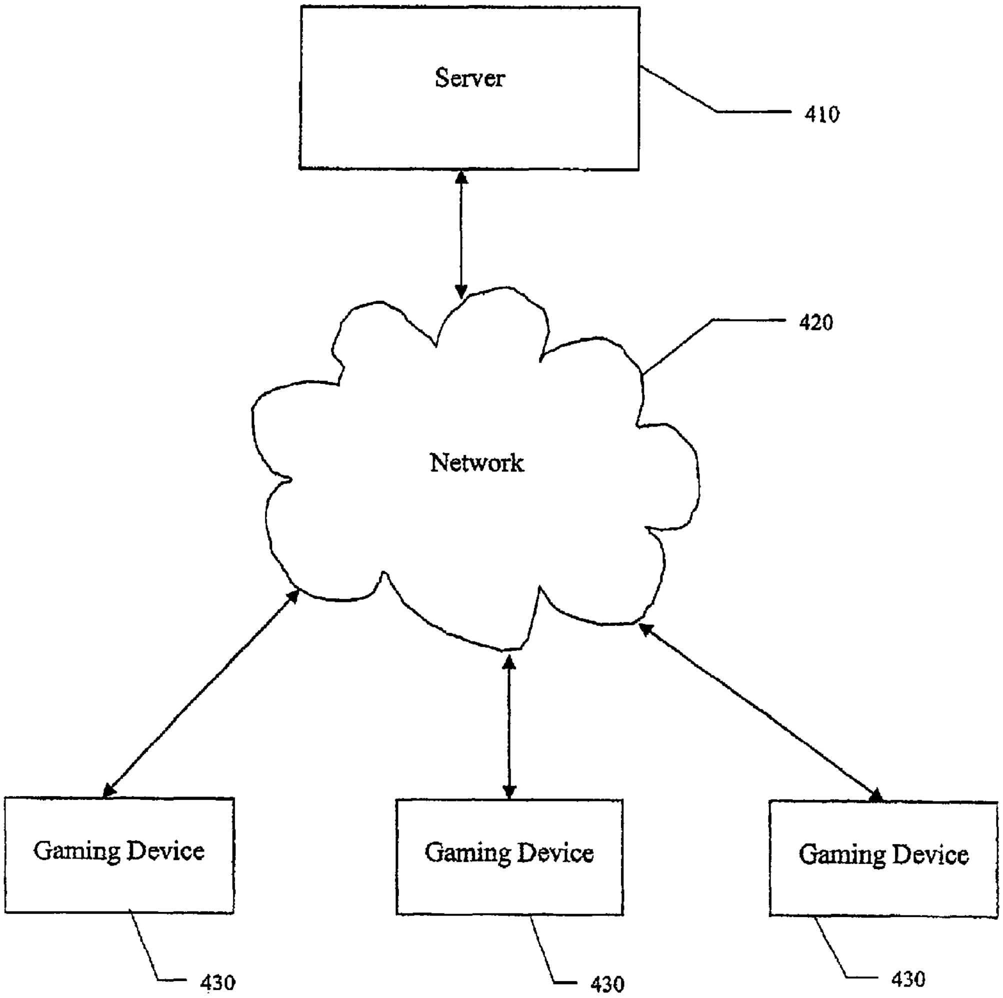
FIG. 4 is a schematic illustration of a server in communication with gaming devices over a network.

Referring now to FIG. 4, a networked gaming environment is schematically illustrated. A server 410 can be connected to a network 420 through a wired or wireless system. A plurality of gaming devices 430 can also be connected to the network. The network 420 can be a private network or a public network, and can include a plurality of networks connected together. The network 420 can, for example, include the internet. The networked gaming environment can allow gaming devices 430 to communicate with a server or with each other. For example, a progressive jackpot can be accumulated based upon activity in multiple games and coordinated by a remote system through server 410.

Software can be downloaded to a gaming device 430 in a background operation while an application, such as a gaming application, runs in the foreground on the gaming device. In one exemplary system, software updates or new games can be downloaded to a gaming device 430 over the network 420 while a patron uses a gaming application on the gaming device. In an embodiment, downloading of software can be controlled from the server 410. For example, in an embodiment, a gaming device 430 can download software over the internet from the server 410. In another embodiment, a server can regulate transfer of software in a peer-to-peer environment. For example, software can be downloaded to a gaming device from another gaming device, with download authorization provided through an authorization server.

Figure 2A:
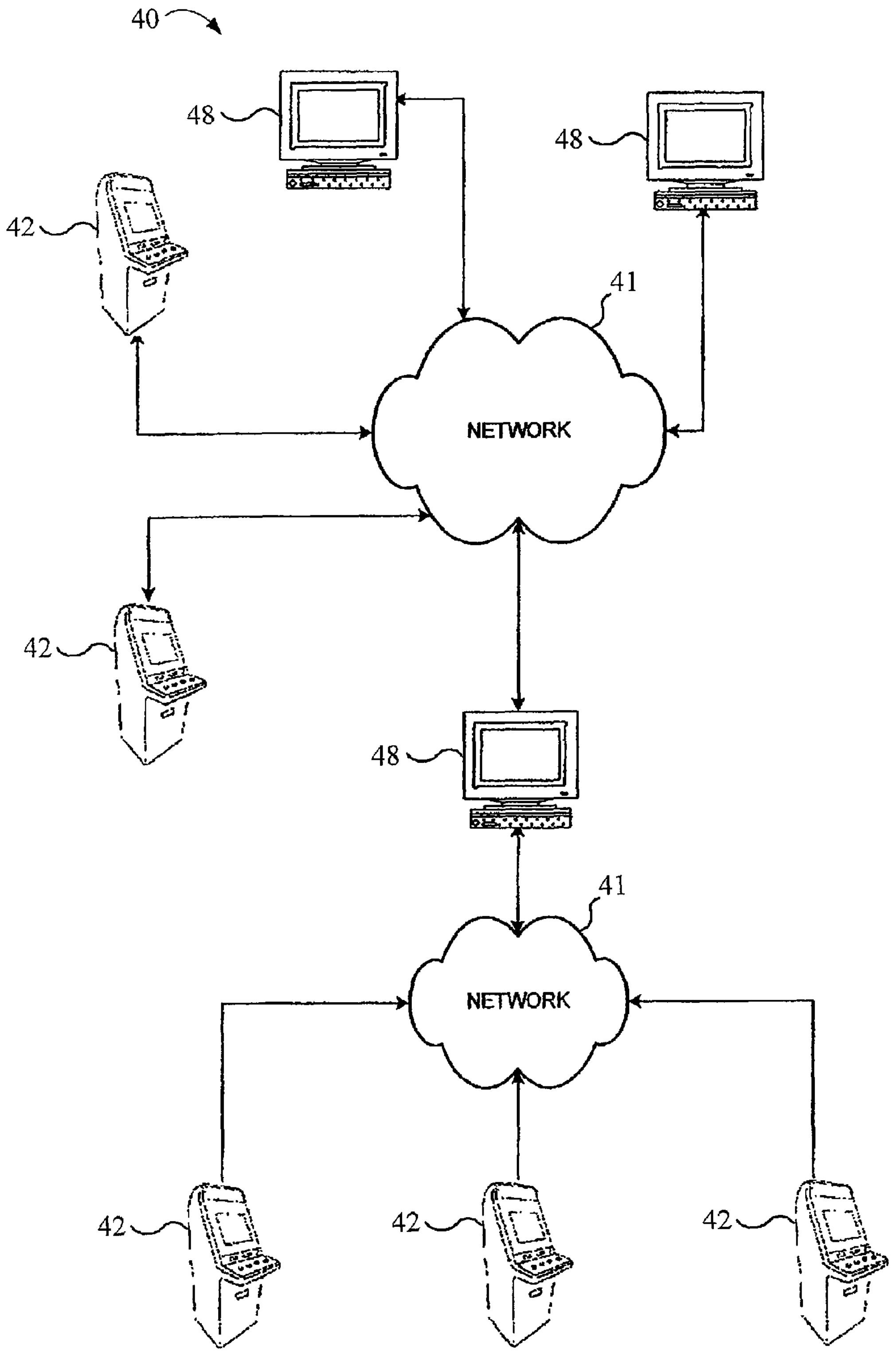
FIG. 2A is a block diagram illustrating one embodiment of a system for delivering gaming content, according to example embodiments of the invention.

Another system for delivering gaming content is illustrated at 40 in FIG. 2A. As shown in FIG. 2A, a system 40 includes gaming machines 42 connected to networks 41. The system 40 also includes gaming content servers 48, which are also connected to the networks 41.

The gaming content servers 48 include gaming content for use by the gaming machines 42. The gaming content can include instructions and/or data for conducting casino style wagering games (e.g., video slots, video poker, video black jack, and the like). In one embodiment, the gaming content can include program code, audio content, video content, and/or other data used for conducting all or part of a casino style slots game and/or bonus events. The gaming content can also include executable game code, game math, art, configuration data (enumerating allowable percentages, denominations, paylines, etc.), operating system features, peripheral device drivers, attract mode displays, advertisements, and episodic game content.

Each gaming content server 48 can include gaming content and logic for transmitting the gaming content for receipt by a gaming machine, while the gaming machine is conducting gaming operations. According to some embodiments, a gaming content server 48 can transmit selected gaming content to a gaming machine 42 or the gaming content server can employ another gaming content server 48 to transmit selected gaming content to a gaming machine 42.

The components of the system 40 can be connected using any suitable connection technology. For example, the components can be connected via RS-232, Ethernet, 802.11, public switched telephone networks, DSL, or any other connection technology. The networks 42 can be a local area network or wide-area network and can transmit gaming content using any suitable communication protocols.

According to embodiments, the gaming content servers 48 can be minicomputers, microcomputers (e.g., laptop or desktop computers), mainframe computers, or any other computing device suitable for storing and transmitting gaming content over one or more computer networks.

Example Gaming Machines and Gaming Content Receiving Unit

Figure 3A:
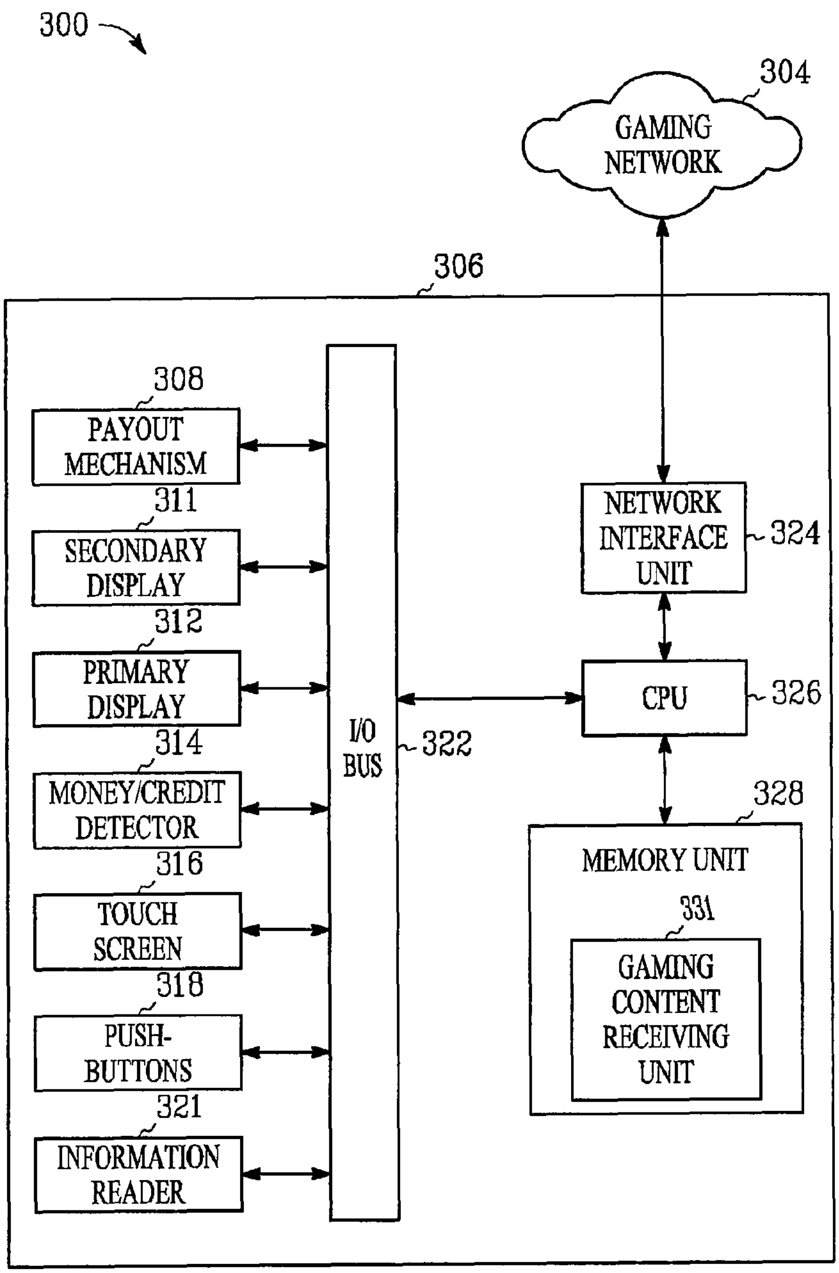
FIG. 3A is a block diagram illustrating components of a gaming machine, used in conjunction with example embodiments of the invention

FIG. 3A is a block diagram 300 illustrating components of a gaming machine, used in conjunction with example embodiments of the invention. As shown in FIG. 3A, the gaming machine 306 includes a central processing unit (CPU) 326 connected to a memory unit 328, which includes a download unit 331. The CPU 326 is also connected to a network interface unit 324, which is connected to a gaming network 304. The CPU 326 is also connected to an input/ output (I/O) bus 322. The I/O bus 322 is connected to a payout mechanism 308, secondary display 311, primary display 312, money/credit detector 314, touchscreen 316, post-buttons 318, and information reader 321. The I/O bus 322 facilitates communication between the system components and the CPU 326.

According to some embodiments, the gaming machine 306 can include additional peripheral devices and/or more than one of each component shown in FIG. 3A. For example, in one embodiment, the gaming machine 306 can include multiple network interface units 324 and multiple CPUs 326. Additionally, the components of the gaming machine 306 can be interconnected according to any suitable interconnection architecture (e.g., directly connected, hypercube, etc.).

According to some embodiments, the gaming machine 306 includes tangible machine-readable media including instructions for conducting a basic wagering game, conducting a bonus game, and receiving gaming content while conducting gaming operations. Machine-readable media includes any mechanism that provides (i.e., stores and/or transmits) information in a form readable by a machine (e.g., a computer). For example, a tangible machine-readable medium includes read only memory (ROM), random access memory (RAM), magnetic disk storage media, optical storage media, flash memory devices, etc. According to embodiments of the invention, the gaming machine 306 and other components of the gaming content servers 308 can include other types of logic (e.g., digital logic) for executing the operations described herein.

Figure 4A:
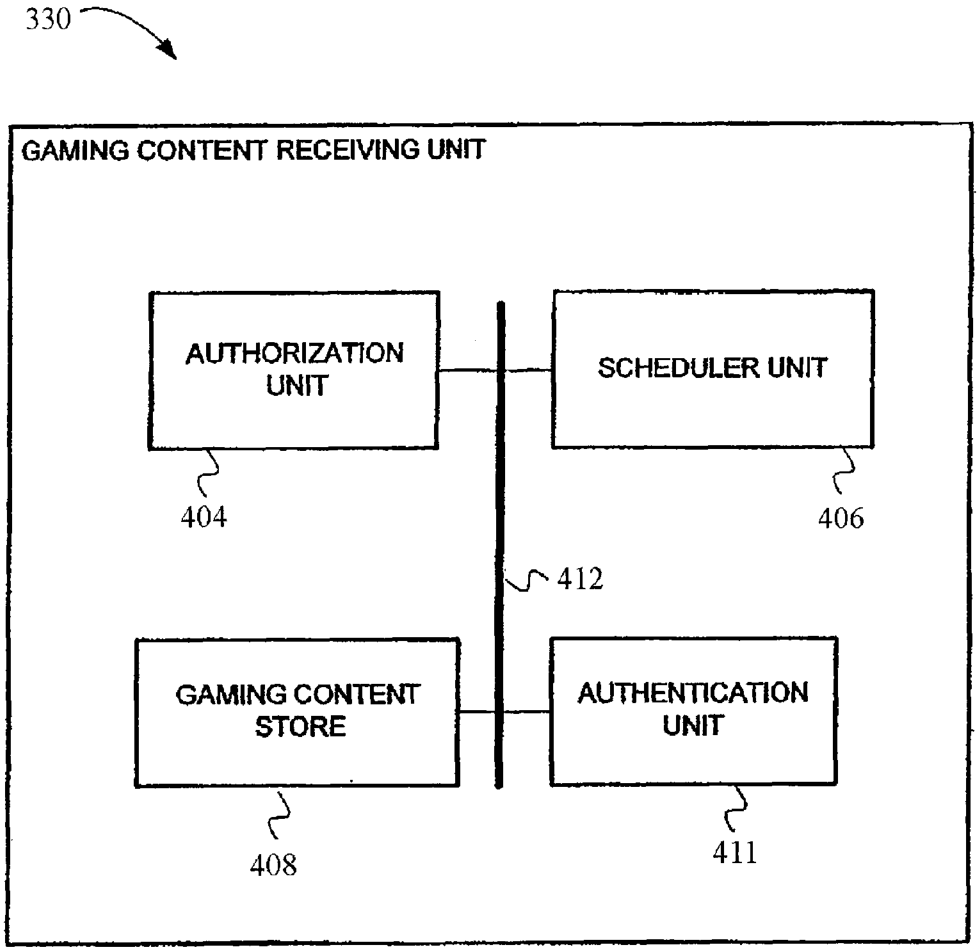
FIG. 4A is a block diagram illustrating components of a gaming content receiving unit, according to example embodiments of the invention

While FIG. 3A describes a block diagram of a gaming machine, FIG. 4A describes a gaming content receiving unit in greater detail. FIG. 4A is a block diagram illustrating components of a gaming content receiving unit, according to example embodiments of the invention. As shown in FIG. 4A, the gaming content receiving unit 330 includes an authorization unit 404, scheduler unit 406, gaming content store 408, and authentication unit 411. In FIG. 4A, these components are connected to a communication bus 412. According to embodiments, these components can include software, hardware, machine-readable media, and/or other logic. These components can communicate according to any suitable communication technique, such as parameter passing, message passing, signaling, etc.

Figure 5:
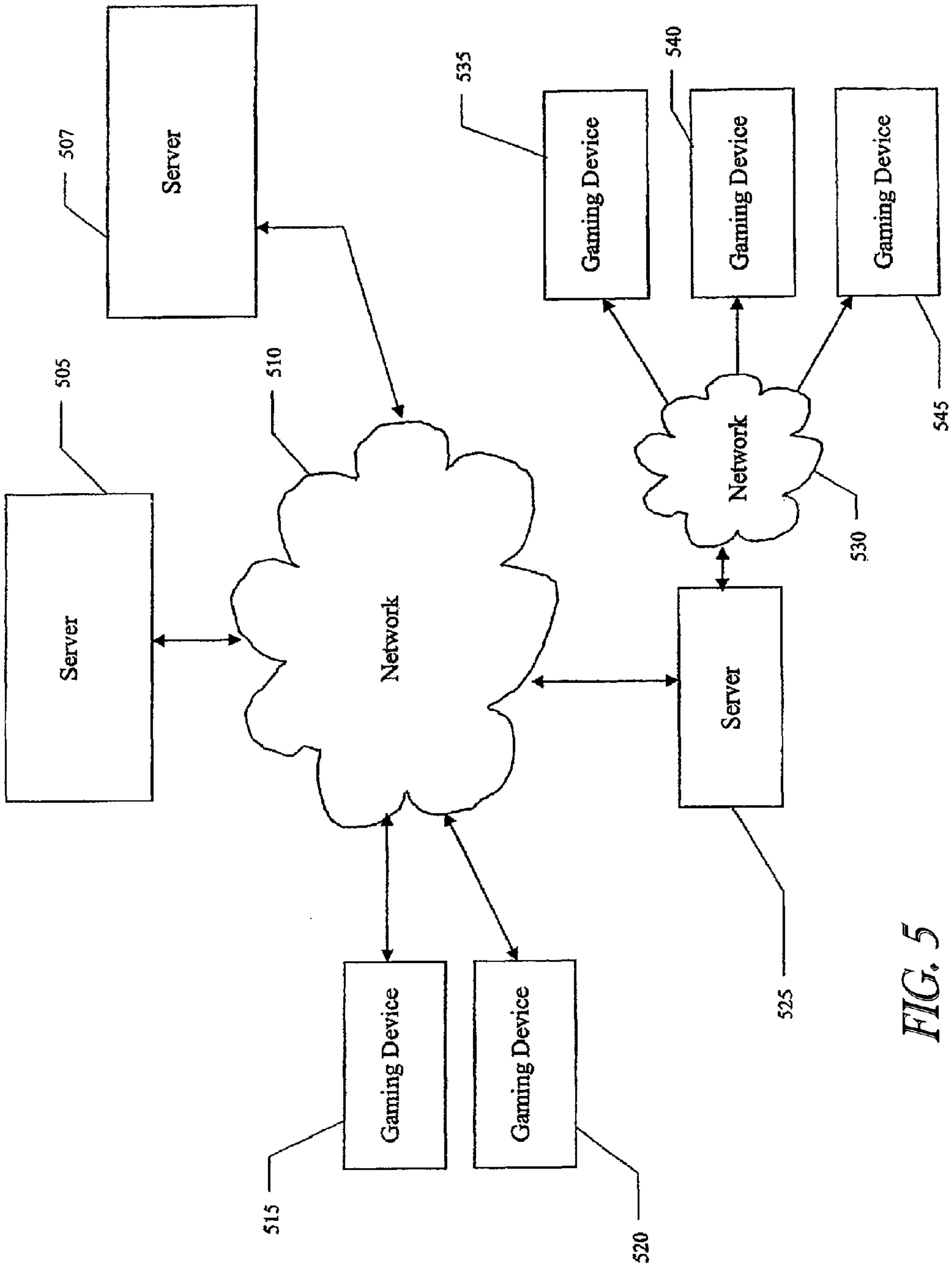
FIG. 5 is a schematic illustration of servers and gaming devices in communication through a network.

FIG. 5 provides schematic illustration of another exemplary networked gaming environment. A server 505 can be connected to a network 510. Gaming devices 515 and 520 can be connected to the network and in communication with the server through the network. A second server 525 can also be connected to the network 510. A second network 530, which can, for example, be a local network at a gaming site, can be connected to the main network 510 through the second server 525. Gaming devices 535, 540, 545 can be connected to the second server 525 through the second network 530. Gaming software or other software can be downloaded through the network 510 to gaming devices 515, 520. Alternatively, gaming software can be downloaded to the second server 525 and then distributed to gaming devices 535, 540, 545 through the second network 530. The downloading of gaming software to gaming devices 535, 540, 545 can be conducted as a background operation while the gaming devices serve a primary gaming function. It is possible, but not preferred, for the second server 525 to be a gaming device. In varying embodiments, a third server 507 can be connected to the network 510. In an embodiment, the third server can provide the same function as the first server 505. For example, the first server and third server can both be configured to provide downloadable software. Alternatively, the first server 505 can provide downloadable software and the third server 507 can provide authorization information.

Figure 6:
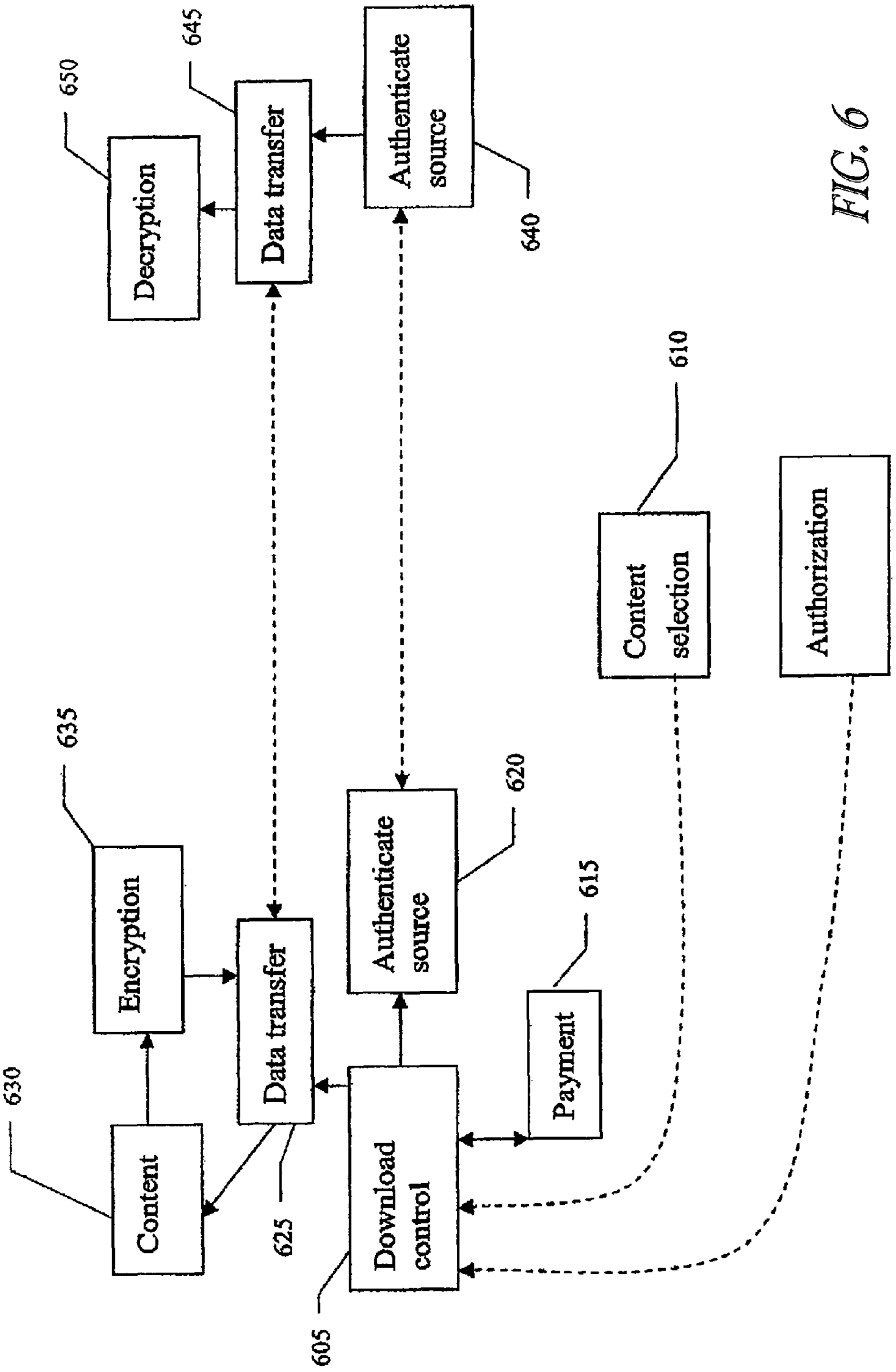
FIG. 6 is a schematic illustration of software modules that can be configured to download software to a gaming device over a network.

FIG. 6 is a schematic illustration that shows an exemplary system of software modules that can be involved in a background download. Download control module 605 determines whether preconditions to the download have been met. Preconditions can include, for example, content selection payment, source authentication, and download authorization. Content selection module 610 allows a user to select content to be downloaded to one or more gaming devices. Authorization module 615 determines whether a particular download is authorized for a particular machine. For example, the authorization module can determine whether permission has been granted for the software to be downloaded. Payment module 617 allows for electronic payment for a download. Authenticate source module 620 confirms the identity of the source of the download with the gaming device. In an embodiment, authenticate source module 620 operates on a server and a second authenticate source module 640 operates on a gaming device. Data transfer module 625 interacts with an encryption module 635 that encrypts content 630. The data transfer module transfers data from a server to a remote client, where a second data transfer module 645 interacts with a decryption module. In an exemplary embodiment, content selection module 610 and authorization module 615 operate on respect remote systems, decryption module 650, data transfer module 645, and authenticate source module 640 operate on a gaming machine, and the remaining modules operate on a server. It is understood that other configurations are possible, and that various modules can operate in a network environment and over multiple systems.

Figure 7A:
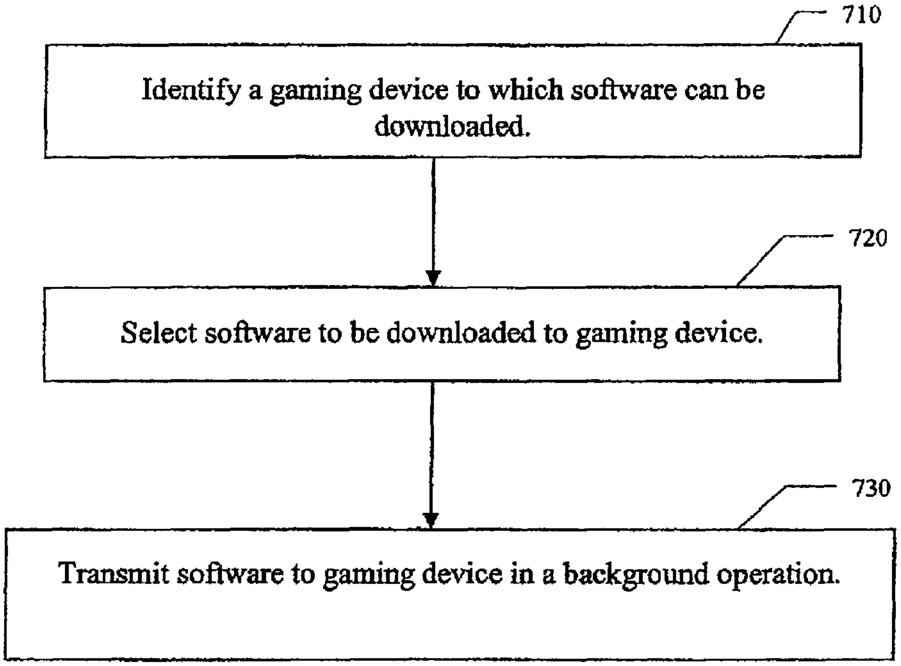
FIG. 7A is a flow chart that illustrates a process by which a gaming device can be identified over a network and software can be transmitted to the gaming device in a background operation.
Figure 7A:
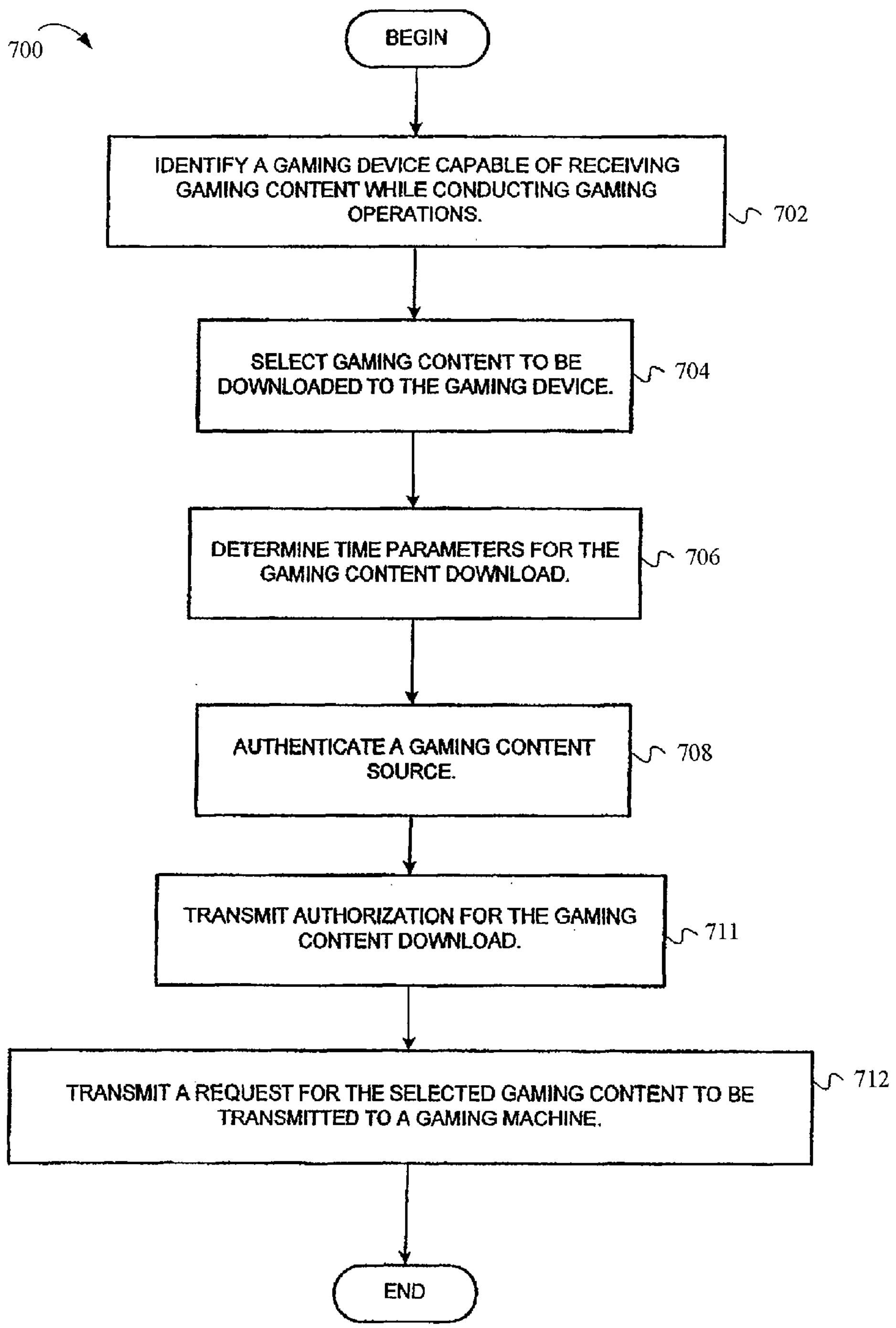

FIG. 7A is a flow chart that illustrates a background download process. Gaming device identification module 710 identifies a gaming device on a network. Software selection module 720 selects software to be downloaded to the gaming device. In an embodiment, software selection module can include a computerized software selection operation. For example, software running on the gaming device can be examined to determine whether a software update or a replacement game is available for the gaming device. Alternatively, available software downloads can be presented to user and a selection can be received from the user through the interface. In varying embodiments, software version information, device information and other information relevant to selection of software can be maintained in a file that can be referenced by an application or transmitted to a server for analysis of whether new software such as gaming software updates or device firmware is available.

Transmission module 730 transmits software to the gaming device in a background operation. In varying embodiments, the transmission of software can be a push process or a pull process. For example, in an embodiment, a download can be initiated from a server, and a patron can continue using a gaming application while the data transmission occurs in the background: The patron may not be aware that software is being downloaded in the background. In another embodiment, the software download (a new game, for example) can be selected by the patron, and the patron can resume playing an old game while the new game is downloaded.

Figure 6A:
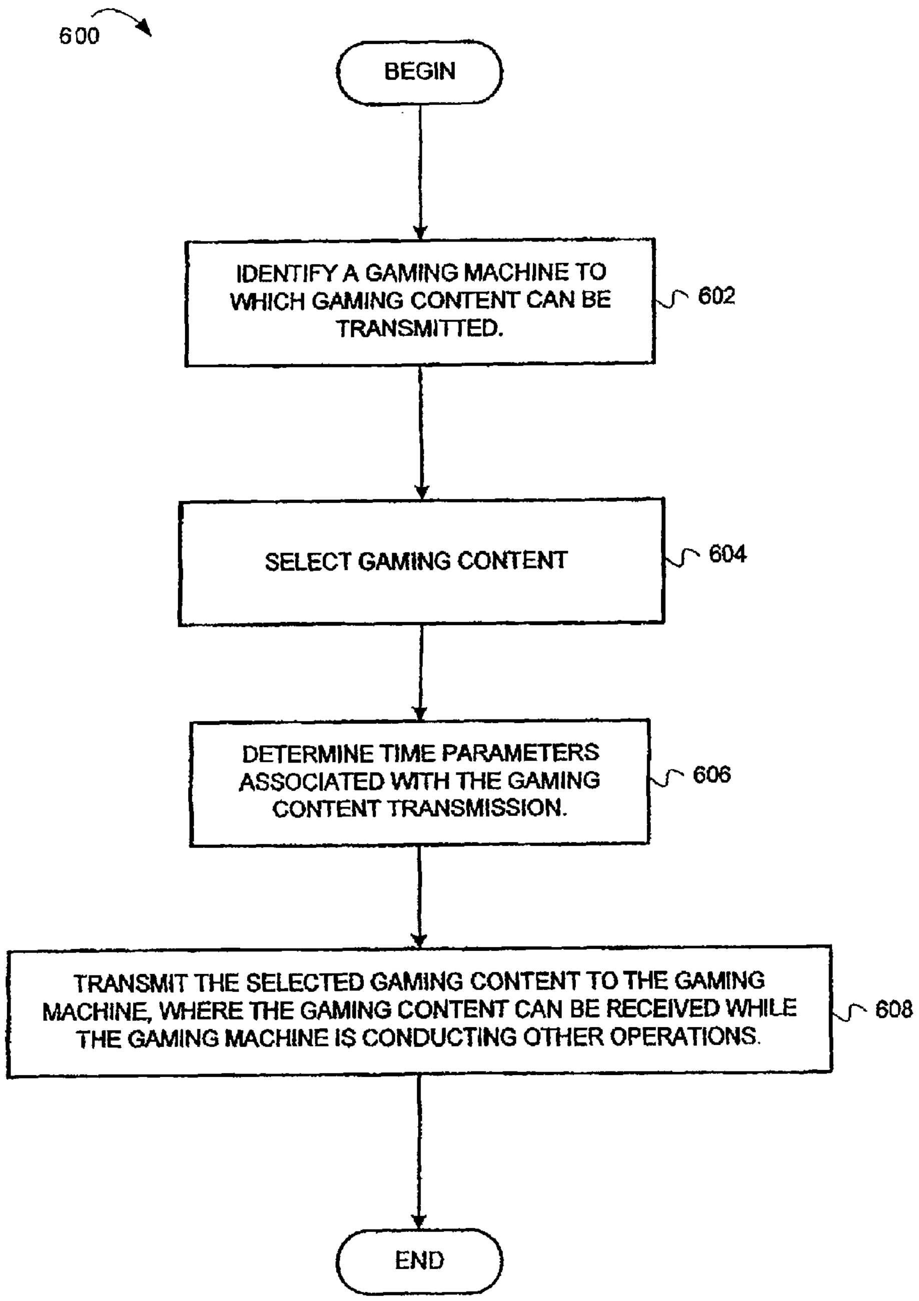
FIG. 6AA is a flow diagram illustrating operations for pushing selected gaming content to a gaming machine, according to example embodiments of the invention.

FIG. 6AA is a flow diagram illustrating operations for pushing selected gaming content to a gaming machine, according to example embodiments of the invention. The flow diagram 600 commences at block 602.

At block 602, a gaming machine is identified. For example, a gaming content server 208 identifies a gaming machine 202 to which it can transmit gaming content. The flow continues at block 604.

At block 604, gaming content is selected. For example, the gaming content server 208 selects gaming content for transmission to the selected gaming machine 202. In one embodiment, the gaming content selection can be configured by a gaming machine operator or a software program to select gaming content based on attributes associated with hardware and/or gaming content on the gaming machine 202. For example, a gaming machine operator can configure the gaming content server 208 to select new device drivers based on hardware devices included in the gaming machine 202 or to select bonus event content related to game software installed on the gaming machine 202.

In another embodiment, the gaming content server 208 can be configured to select gaming content relevant to a gaming machine for a particular time. For example, the gaming content server 208 can select gaming content for advertising an upcoming event, such as a boxing match or music concert. The flow continues at block 606.

At block 606, time parameters for the gaming content transmission are determined. For example, the gaming content server 208 determines time parameters associated with the gaming content transmission. In one embodiment, the gaming content server 208 determines a time when the gaming machine 202 can receive the selected gaming content while the gaming machine 202 is performing gaming operations (e.g., conducting a wagering game). The content server 208 can schedule gaming content transmissions for times at which the gaming machine 202 is not offline or inoperative. The flow continues at block 608.

At block 608, the selected gaming content is transmitted for receipt by the gaming machine while the gaming machine is conducting gaming operations. For example, the gaming content server 208 transmits the selected gaming content to the gaming machine 202, while it is conducting wagering games. From block 608, the flow ends.

While FIG. 6 describes embodiments in which one gaming content server pushes gaming content to a gaming machine, FIG. 7AA describes operations for using more than one gaming content server for pushing gaming content to a gaming machine 202.

FIG. 7AA is a flow diagram illustrating operations for requesting a gaming content source to transmit selected gaming content to a gaming machine, according to example embodiments of the invention. The flow diagram 700 commences at block 702.

At block 702, a gaming machine capable of receiving content while conducting gaming operations is identified. For example a gaming content server 208 identifies a gaming machine 202 capable receiving gaming content while the gaming machine 202 conducts gaming operations (e.g., conducting a casino wagering game). The flow continues at block 704.

At block 704, content is selected for transmission to the gaming device. For example, the gaming content server 208 selects gaming content for transmission to the gaming device 202. The flow continues at block 706.

At block 706, time parameters are determined for the gaming content transmission. For example, the gaming content server 208 determines when the gaming content should be transmitted to the gaming machine 202. In one embodiment, the gaming content server 208 can determine when the gaming machine 202 will be inoperable and schedule the transmission for when the gaming machine is conducting gaming operations. The gaming content server 208 can also monitor network conditions and schedule the gaming content transmission for times when network traffic is light. The flow continues at block 708.

At block 708, a gaming content source is authenticated. For example, the gaming content server 208 authenticates another gaming content server 208, which has the selected gaming content. The gaming content server 208 can use any suitable authentication technique for authenticating the other gaming content server 208. For example, the gaming content server 208 can use encrypted key exchange to authenticate another gaming content server. The flow continues at block 711.

At block 711, authorization for the content transmission is transmitted. For example, the gaming content server 208 transmits an authorization for the other gaming content server to transmit the selected content to a selected gaming machine. The flow continues at block 712.

At block 712, a request for transmission of the selected content to a gaming machine is transmitted. For example, the gaming content server 208 transmits a request to the other gaming content server, where the request is for transmission of the selected content to the gaming machine (indicated in the authorization). In one embodiment, the request includes time parameters indicating when the transmission should occur.

Figure 7B:
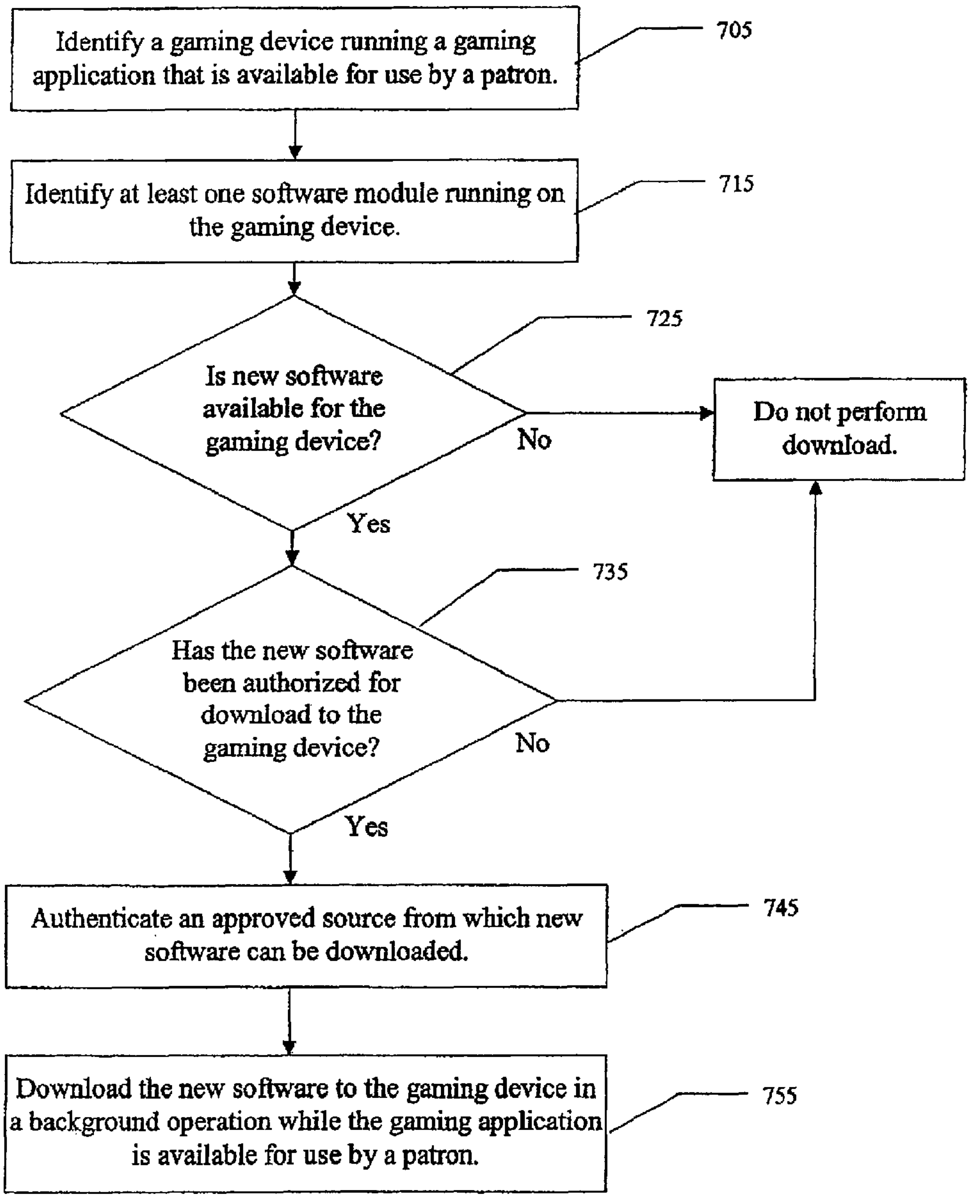
FIG. 7B is flow chart that illustrates a process by which a gaming device can be identified, a determination can be made whether new software for the machine is available, and the new software can be downloaded from an authenticated source.

FIG. 7B is flow chart that illustrates a process by which authorized software is downloaded to a gaming device. Gaming device identification module 705 identifies a gaming device running a gaming application that is available for use by a patron. For example, gaming device identification module 705 can be a module running on the gaming machine that contacts a server. Software identification module 715 identifies at least one software module running on the gaming device. For example, software identification module can identify the application that is available for use by a patron. Inquiry operation 725 checks whether new software is available for the gaming device. New software can include, for example, an update for an existing game or a completely new game. Authorization operation 735 checks whether the software has been authorized for download to the gaming device. For example, gaming devices are subject to regulations that can vary by location and jurisdiction. In an embodiment, authorization operation 735 identifies the location of the gaming device and determines whether the software download has been authorized for the location. Authenticate module 745 authenticates an approved source from which the software can be downloaded. The approved source can be a server, for example. In an embodiment, update inquiry operation 725, authorization operation 735, and authenticate module 745 all operate on the same server. Alternatively, the operations 725, 735 can operate on one or more different servers. In an embodiment, a dedicated download server can be provided as an approved source for supplying new software. Alternatively, a peer-to-peer protocol can be used to download software from one gaming machine to another. Download module 755 transmits the new software to the gaming device in a background operation while a gaming application is available for use by a patron.

Figure 8A:
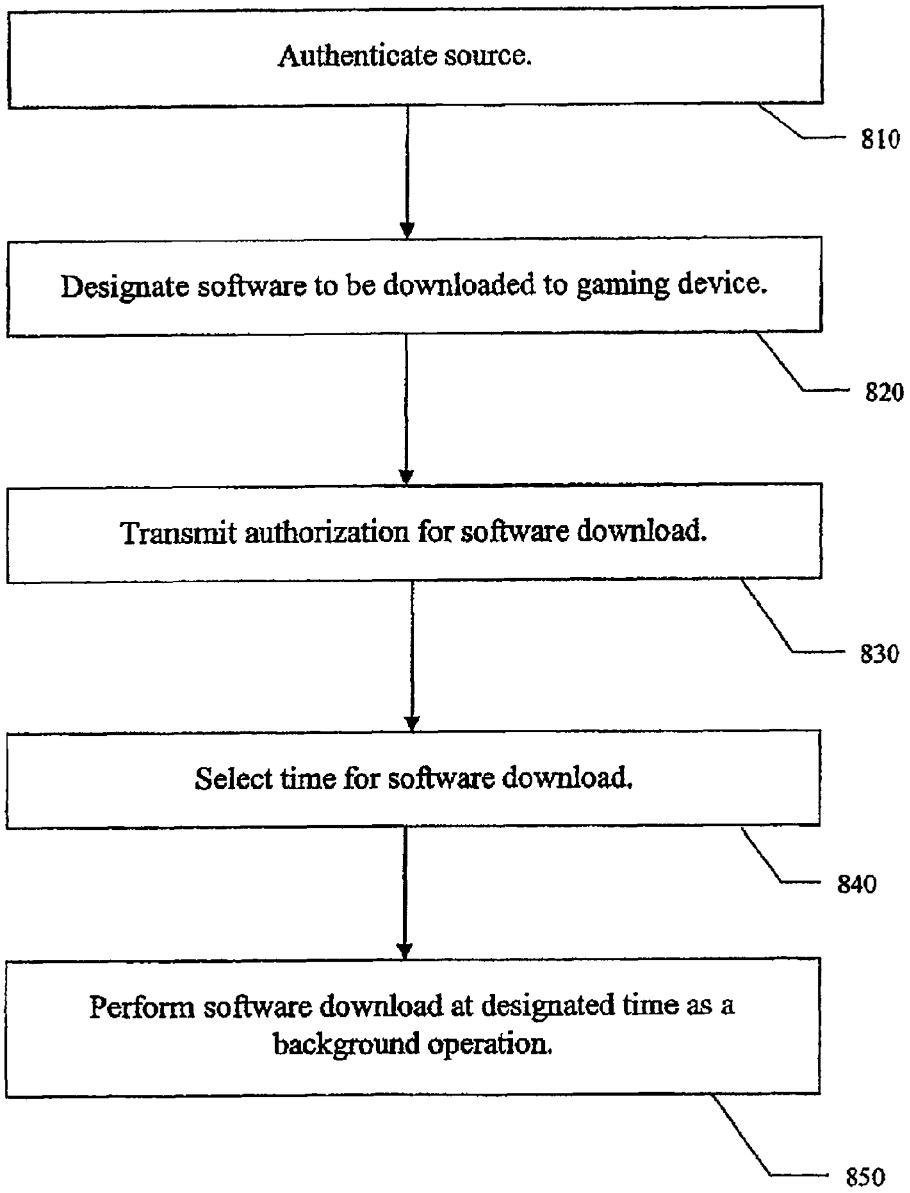
FIG. 8A is a flow chart that illustrates a process of downloading software to a gaming device in a background operation at a specified time.
Figure 8A:
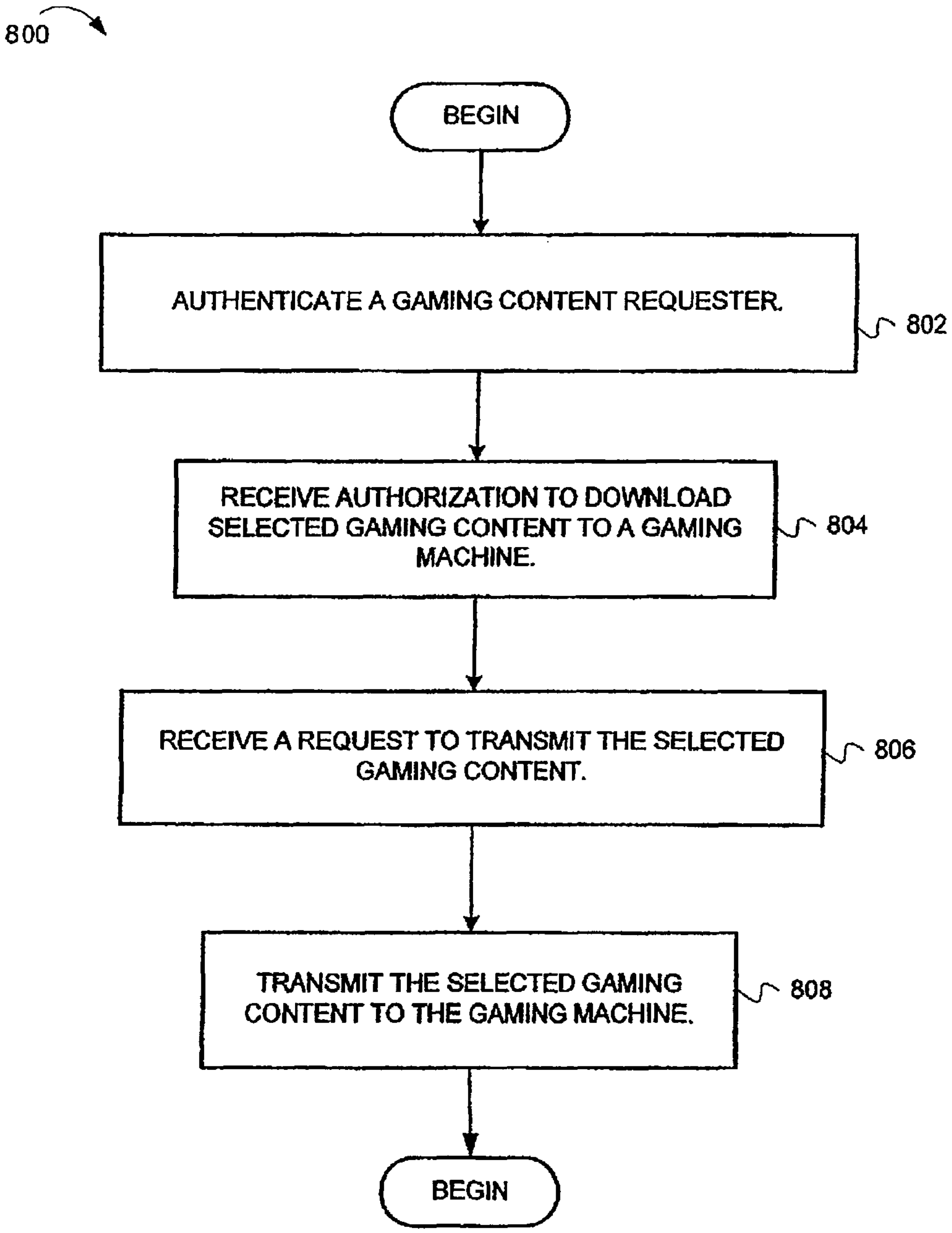

FIG. 8A is a flow chart that illustrates a process of downloading software to a gaming device in a background operation at a specified time. Authenticate module 810 authenticates a source from which software can be downloaded to a gaming machine. Designate software module 820 designates the software to be downloaded to the gaming device. The software can, for example, be gaming software, video, or advertising content. Authorization module 830 transmits authorization for the software download. Download time module 840 selects a time for a software download. In an embodiment, a download time is selected based upon one or more parameters including, for example, an on/off schedule for the gaming device in jurisdictions which require that gaming devices be turned off periodically. Other parameters can include the schedule of downloads to other machines, a schedule by which games are periodically changed or updated, or an advertisement schedule. In another embodiment, the time for downloading the software can be selected through a user interface. For example, a user interface can suggest one or more proposed times for the software download. Download module 850 performs the specified software download at the selected time.

Another embodiment is shown in FIG. 8AA. FIG. 8AA is a flow diagram illustrating operations for transmitting, in response to a transmission request, gaming content from a content source to a gaming machine, according to example embodiments of the invention. In some embodiments, one gaming content server 208 transmits gaming content selected by another content server. The gaming content server 208 that includes the gaming content is the content source, whereas the gaming content server 208 requesting transmission of the gaming content is the content requester. The flow diagram 800 begins at block 802.

At block 802, a gaming content requester is authenticated. For example, a source gaming content server 208 (i.e., the content source) authenticates another gaming content server 208 (i.e., the gaming content requester). According to embodiments, the content source can use any suitable authentication technique for authenticating the content requester. The flow continues at block 804.

At block 804, authorization to transmit selected content the gaming machine is received. For example, the source gaming content sever 208 receives, from the content requester, authorization to transmit selected gaming content to the gaming machine. The flow continues at block 806.

At block 806, a request to transmit selected gaming content is received. For example, the source gaming content server 208 receives a transmission request from the content requester. In one embodiment, the transmission request indicates selected gaming content that is to be transmitted to a particular gaming machine 202. In one embodiment, the transmission request also includes time parameters, which indicate when the selected gaming content should be transmitted to the gaming machine. The flow continues at block 808.

At block 808, the selected content is transmitted to the machine. For example, the source gaming content server 208 transmits the selected gaming content to the gaming machine 202. From block 808, the flow ends.

FIGS. 6AA-8AA describe embodiments in which gaming content servers 208 perform operations for pushing gaming content over a network. The discussion of FIG. 9 will describe embodiments in which a gaming machine 202 receives the gaming content pushed by the gaming content servers 208.

Figure 8B:
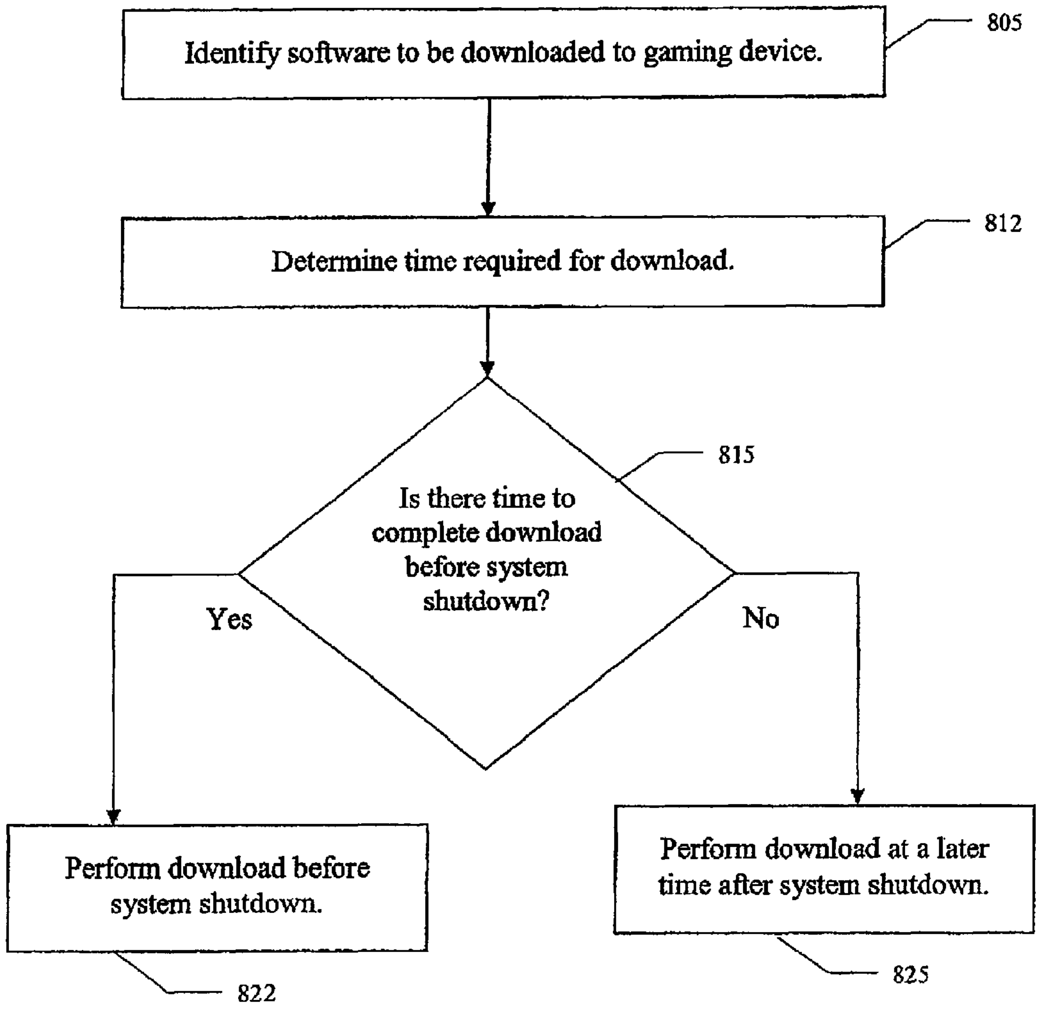
FIG. 8B is a flow chart that illustrates a process that includes determining whether a software download can be completed before a scheduled shutdown of a gaming device.

FIG. 8B is a flow chart that illustrates a download process where a determination is made whether the download can be complete before a scheduled machine shutoff. Some regulations require that gaming devices be periodically shut off. Identify software module 805 identifies data to be downloaded to a gaming device. Compute time module 812 determines how much time is required for the download based upon network connection speeds and the size of the download. Schedule download operation 815 determines whether there is enough time to complete the download before the device is shut down. If there is not time complete the download before the system shutdowns, then at block 825 the download is performed at a later time after the system shutdown. If there is time to complete the download before the system shutdown, then at block 822 the download is performed before the system shutdown.

Figure 9:
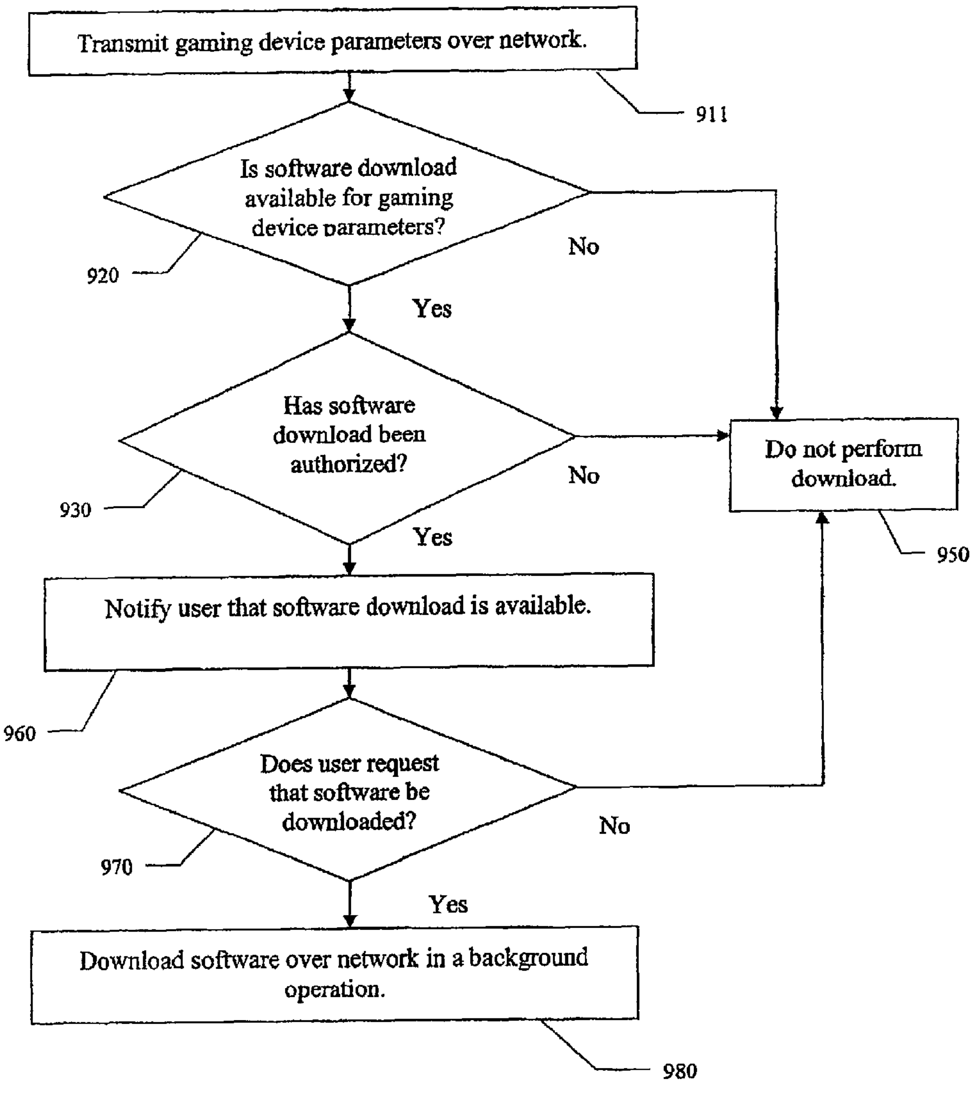
FIG. 9 is a flow chart that illustrates a process by which authorized software can be selectively downloaded in a background operation to a device with specified parameters.
Figure 9A:
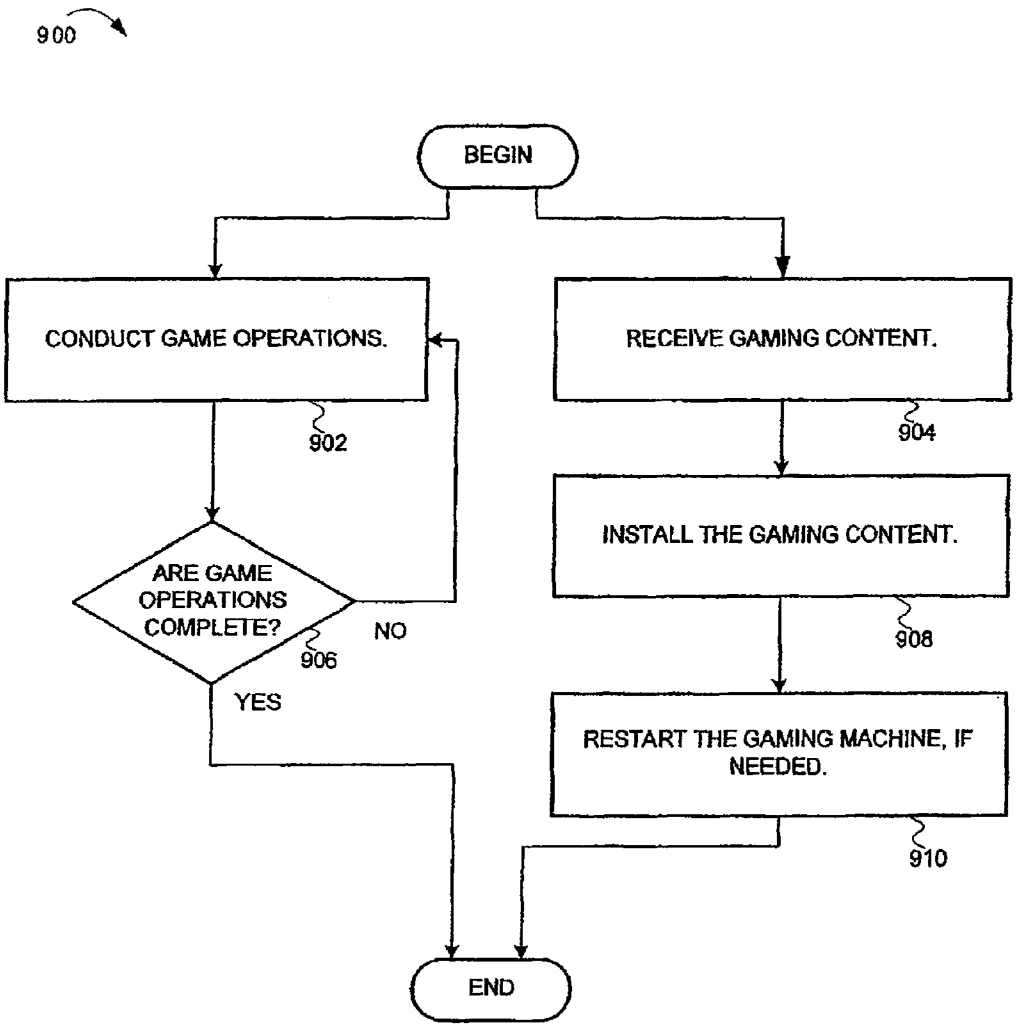
FIG. 9AA is a flow diagram illustrating operations receiving gaming content while conducting gaming operations, according to example embodiments of the invention.

FIG. 9AA is a flow diagram 900 illustrating operations for receiving gaming content while conducting gaming operations, according to example embodiments of the invention. The flow commences in parallel at block 902 and 908.

At block 902, gaming operations are conducted. For example, the gaming machine 202 begins conducting gaming operations. In one embodiment, gaming operations include executing program code and/or logic for conducting a casino wagering game and bonus events, presenting media for attracting game players, and presenting other media to players. From block 902, the flow continues at block 904.

At block 904, the determination is made about whether gaming operations are complete. For example, the gaming machine 202 determines whether gaming operations are complete. If gaming operations are not complete, the flow continues at block 902. Otherwise, the flow ends.

Operations at blocks 906, 908, and 910 can be performed in parallel with the operations shown at blocks 902 and 904. In one embodiment, the operations at blocks 906, 908, and 910 can execute contemporaneously with or in partial overlap with those at blocks 908 and 910.

At block 906, gaming content is received. For example, the gaming machine's gaming content receiving unit 330 receives the gaming content over the gaming network 210. In one embodiment, the gaming content receiving unit 330 stores the gaming content in its gaming content store 408. As noted above, in one embodiment, the gaming content receiving unit 330 receives the gaming content at the same time the gaming machine 306 is conducting gaming operations (see block 902). The flow continues at block 908.

At block 908, the gaming content is installed. For example, the gaming machine installs the gaming content on the gaming machine. In one embodiment, installing the gaming content includes integrating the gaming content with content already residing on the gaming machine and configuring the gaming content for use in gaming operations. The flow continues at block 910.

At block 910, the gaming machine is restarted, if needed. For example, if a system restart is necessary for configuring the new gaming content for use, the gaming machine restarts itself.

If the newly configured gaming content is applicable for only a certain time period (see discussion of block 604), the gaming machine 202 will use the gaming content for only that time period. For example, if the newly configured gaming content includes an advertisement for an upcoming boxing match, the gaming machine 202 will use the advertisement until the boxing match takes place. After the time period passes, the gaming machine 202 can remove or disable the gaming content. From block 910, the flow ends.

FIG. 9 is a flow chart that illustrates a process by which authorized software can be selectively downloaded in a background operation to a device with specified parameters. Transmit parameters module 911 transmits gaming device parameters over a network. The gaming device parameters can include, for example, the geographical location of the gaming device, the jurisdictional authority or authorities to which the gaming device is subject, the software that is already resident on the gaming device, the position of the device in a casino, the hardware configuration of the device, and the owner of the device. Available software operation 920 checks whether a software download is available based upon one or more of the parameters. If software is available, check authorization module 930 checks whether the available software has been authorized for downloading to the gaming device, based on one or more of the parameters. If software is not available or the software download has not been authorized, the download is not performed 950. Notify user module 960 notifies a user that a software download is available. In an embodiment, a gaming device administrator is notified that new software is available. For example, the gaming device administrator can be notified when he or she visits a gaming device administration web site. Alternatively, an email can be sent to the gaming administrator, or a message can be delivered through a gaming administration application. Other known schemes for notifying an administrator are possible, and are not beyond the scope of the present method. In another embodiment, a game patron is notified of the availability of new software (e.g., a new game). Software request operation 970 receives a request that software be downloaded. If no software is requested, a download is not performed 950. If software is requested, download operation 980 downloads the software over a network to the gaming device in a background operation.

Figure 10:
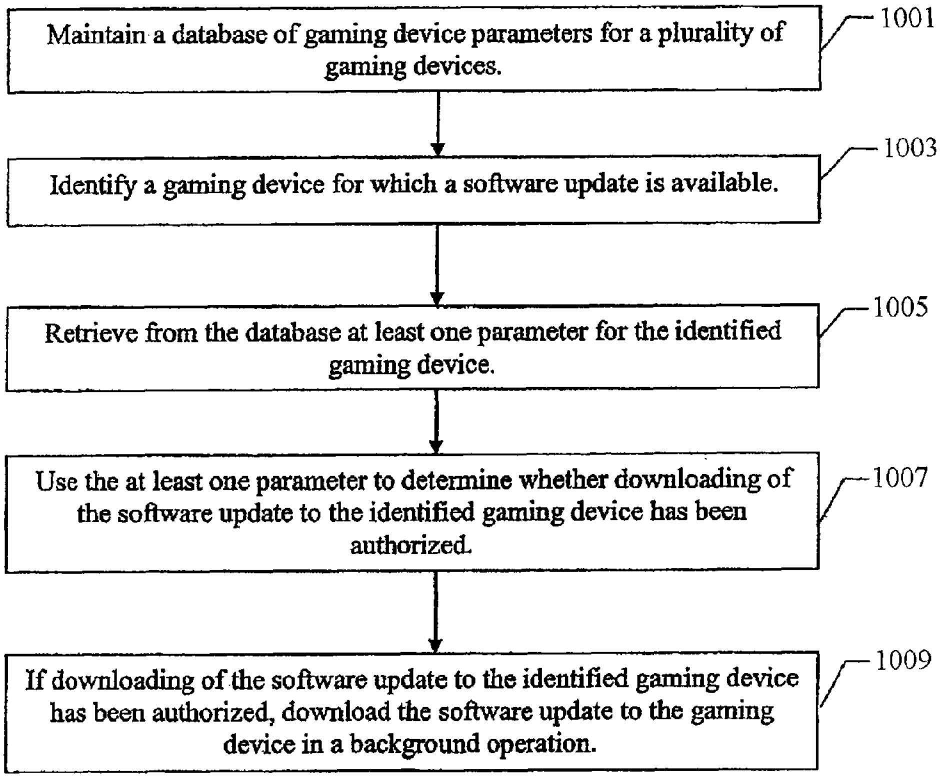
FIG. 10 is a flow chart that illustrates a process by which software can be downloaded to a gaming device based upon an authorization status in a database.
Figure 10A:
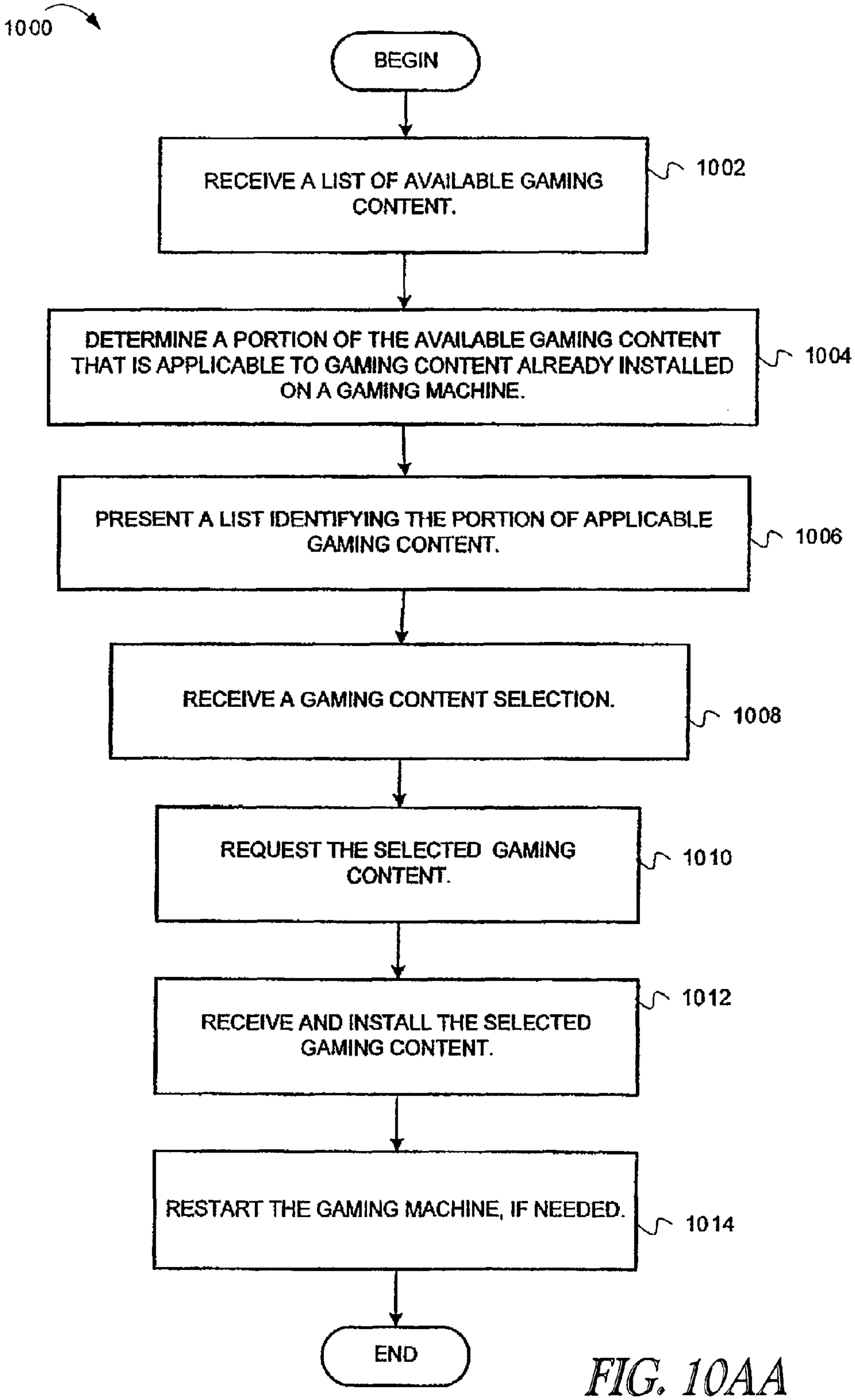
FIG. 10AA is a flow diagram illustrating operations for pulling gaming content, according to example embodiments of the invention

FIG. 10AA is a flow diagram illustrating operations for pulling gaming content, according to example embodiments of the invention. The flow diagram 1000 commences at block 1002.

At block 1002, a list of available a gaming content is received. For example, the gaming content receiving unit 330 receives a list of available a gaming content. The flow continues at block 1004.

At block 1004, a determination is made about what portion of the available gaming content is applicable to content already installed on the gaming machine. For example, the gaming content receiving unit 330 determines which, if any, of the available gaming content is applicable to the gaming content already installed on the gaming machine. For example, if new device drivers are available, the gaming content receiving unit 330 determines whether any of the available device drivers can be used by the gaming machine. As another example, if new bonus event content is available, the gaming content receiving unit 330 determines whether any of the new bonus event content can update bonus event content already installed on the gaming machine. As yet another example, if new time sensitive content (e.g., event advertisement content) is available, the gaming content receiving unit 330 determines which of the available content is applicable to the gaming machine 202. The flow continues at block 1006.

At block 1006, a list identifying the portion of applicable gaming content is presented. For example the gaming content receiving unit 330 presents a list of the gaming content that is applicable to gaming content already installed on the gaming machine 306. In one embodiment, the gaming machine presents the list to a gaming machine operator in a graphical user interface. In one embodiment, the list is presented through the network interface unit 320 to a remote computer on the gaming network 304. The flow continues at block 1008.

At block 1008, a gaming content selection is received. For example, the gaming content receiving unit 330 receives a gaming content selection through a user interface. The flow continues at block 1010.

At block 1010, the selected gaming content is requested. For example, the gaming content receiving unit 330 requests the selected gaming content from a gaming content server 208. The flow continues at block 1012.

At block 1012, the selected content is received and installed. For example, the gaming content receiving unit 330 receives the selected content and installs it on the gaming machine 306. In one embodiment, the gaming content receiving unit 330 can receiving and install system or game software (e.g., device drivers, pay tables, etc.). The flow continues at block 1014.

At block 1014, the gaming machine is restarted if necessary. For example, the gaming content receiving unit 330 requests that the gaming machine 306 restart its system software, if a restart is needed for configuring the newly installed gaming content. If time sensitive gaming content is installed, it can operate until the expiration of any of its time period. From block 1014, the flow ends.

FIG. 10 is a flow chart that illustrates a process by which software can be downloaded to a gaming device based upon an authorization status in a database. Database module 1001 includes parameters for a plurality of gaming devices. Parameters can include device location, relevant jurisdiction, software configuration, and others. Identification module 1003 identifies a gaming device for which a software update is available. Retrieve parameter module 1005 retrieves from the database at least one parameter for the identified gaming device. For example, the relevant jurisdiction can be retrieved by module 1005. Check authorization module 1007 uses one or more parameters from the database to determine whether downloading the software update to the gaming device is authorized. For example, check authorization module 1009 can reference a second database to identify whether the software update has been approved in the relevant jurisdiction. If downloading of the software update to the identified gaming device has been authorized, download module 1009 downloads the software update to the gaming device in a background operation.

Figure 11:
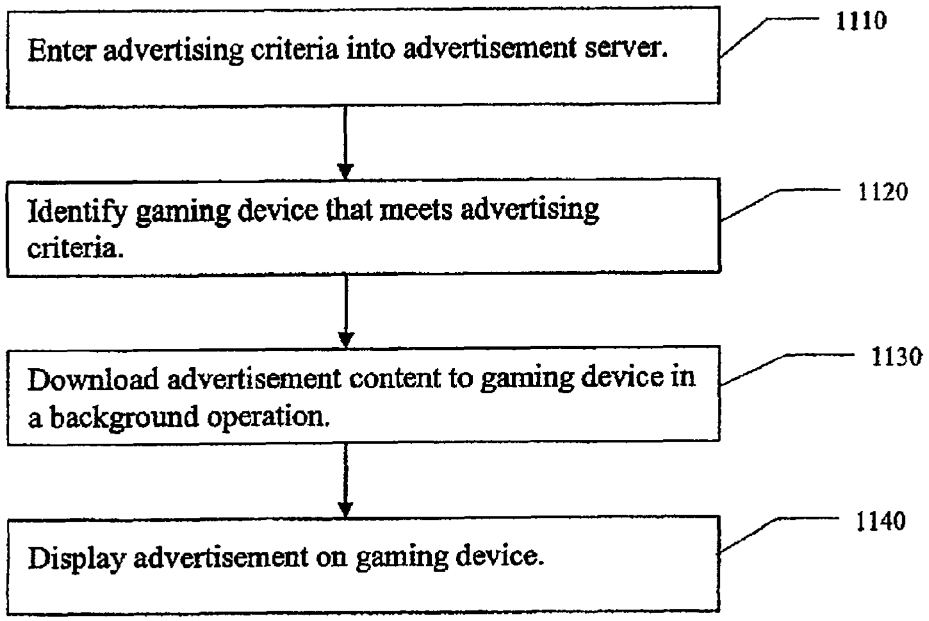
FIG. 11 is a flow chart that illustrates a method by which an advertisement can be downloaded onto a gaming device in a background operation.
Figure 11A:
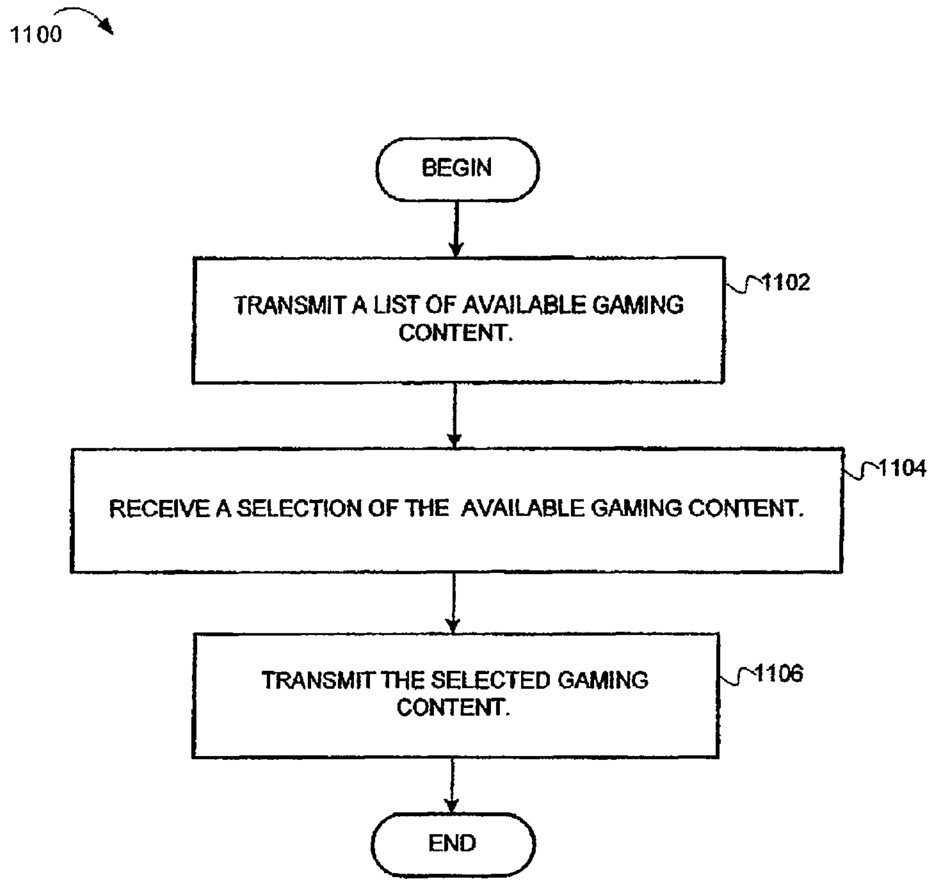
FIG. 11AA is a flow diagram illustrating operations for delivering gaming content to a gaming machine.

FIG. 11AA is a flow diagram illustrating operations for delivering gaming content to a gaming machine. The flow begins at block 1102.

At block 1102, a list of available gaming content is transmitted. For example, the gaming content server 208 transmits a list of available gaming content to a gaming machine 202. The flow continues at block 1104.

At block 1104, a selection of available gaming content is received. For example, the gaming content server 208 receives a selection from the list of available gaming content. The flow continues at block 1106.

At block 1106, the selected content is transmitted. For example, the gaming content server 208 transmits the selected gaming content to the gaming machine 202. In an alternative embodiment, the gaming content server 208 arranges for the selected content to be transmitted by another gaming content server. In one embodiment, the selected gaming content is transmitted according to time parameters included with the selection received at block 1104. From block 1106, the flow ends.

FIG. 11 is a flow chart that illustrates a method by which an advertisement can be downloaded onto a gaming device in a background operation. Criteria module 1110 enters advertising criteria into an advertisement server. The criteria can be, for example, the location of a gaming device in a casino, the geographic location of the device, the type of game, the game stakes, or other information. The criteria can be pre-set to permit automated selection, or a user interface can be presented to a user. Game identification module 1120 identifies a gaming device that meets the one or more advertising criterion. Download module 1130 downloads the advertising content in a background operation. Display module 1140 displays the advertising content on the gaming device.

Figure 12:
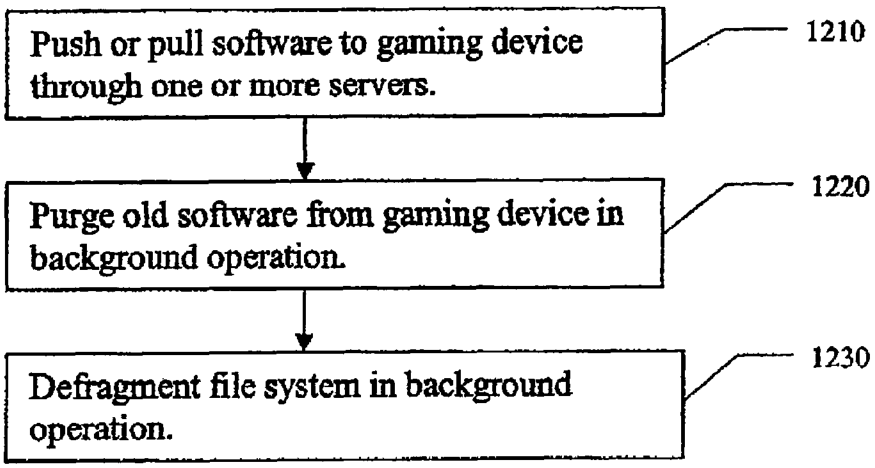
FIG. 12 is a flow chart that illustrates a method by which software can be downloaded to a gaming device and old software can be purged from the device.

FIG. 12 is a flow chart that illustrates a method by which software can be downloaded to a gaming device and old software can be purged from the device. Download module 1210 downloads software to the gaming device. Software can be pulled by the gaming device or pushed by the server. Purge module 1220 purges old software from the gaming device in a background operation. Defragment module 1230 defragments the file system.

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "example embodiment" means that the embodiment being referred to serves as an example or illustration.

Herein, block diagrams illustrate example embodiments of the invention. Also herein, flow diagrams illustrate operations of the example embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel.

What is claimed is:

1. A non-transitory machine-readable medium including instructions, which when executed by machine, cause the machine to perform operations comprising:

conducting a wagering game in a gaming machine;

determining if there is a sufficient amount of time to complete a download of gaming content before a shutdown time of the gaining machine, including determining the shutdown time of the gaming machine based on a predetermined on/off schedule, wherein the predetermined on/off schedule causes periodic shutdown of the gaming machine at regular intervals; and receiving, over a network and during conduction of the wagering game, the gaming content in the gaming machine, in response to determining there is a sufficient amount of time to complete the download of gaming content.

2. The non-transitory machine-readable medium of claim 1, further comprising:

determining available gaming content that is applicable to gaming content already installed on the gaming machine;

presenting a list enumerating the available gaming content that is applicable to gaming content already installed on the gaming machine;

receiving a selection of the available gaming content from the list;

requesting the selected gaming content; and receiving the selected gaming content.

3. The non-transitory machine-readable medium of claim 1, wherein parts of the gaming content are simultaneously received, over the network, from different sources.

4. The non-transitory machine-readable medium of claim 1 further comprising:

after receiving gaming content, installing the gaming content on the gaining machine.

5. The non-transitory machine-readable medium of claim 2, wherein the gaming content includes content for advertising an event, product, or service.

6. The non-transitory machine-readable medium of claim 1, wherein the gaming content includes game themes, game settings, bonus events, pay tables, program code, audio content, or video content.

7. A method comprising:

selecting a gaming machine to which gaining content can be transmitted over a network;

selecting gaming content for transmission to the gaming machine;

transmitting the selected content to the gaming machine for receipt while the gaming machine is conducting gaining operations;

transmitting a request for a software download from the gaming machine to a data server;

verifying that the requested software download has been authorized;

determining if there is a sufficient amount of time to complete the requested software download before a shutdown time of the gaining machine, including determining the shutdown time of the gaming machine based on a predetermined on/off schedule, wherein the predetermined on/off schedule causes periodic shutdown of the gaining machine at regular intervals; and transmitting the requested software download to the gaming machine as a background operation while the gaming application runs in the foreground, in response to determining there is a sufficient amount of time to complete the requested software download.

8. The method of claim 7, further comprising:

authenticating a source of the selected gaming content.

9. The non-transitory machine-readable medium of claim 1, further comprising:

delaying the software download based on determining there is insufficient time to complete the software download before a scheduled gaming machine shutdown.

10. A machine-assisted method comprising:

identifying through a network a gaming device connected to the network, the gaming device running a gaming application that is available for use;

identifying through the network at least one software module running on the gaining device;

determining whether new software is available for the gaming device;

if new software is available for the gaming device, determining whether the new software has been authorized for download to the gaming device and, if the new software has been authorized:

authenticating an approved source from which new software can be downloaded;

identifying a time for a download of the new software to occur and complete before a shutdown time of the gaining device based on a predetermined on/off schedule, wherein the predetermined on/off schedule causes periodic shutdown of the gaming device at regular intervals including at the shutdown time; and downloading the new software to the gaming device in a background operation at the identified time while the gaming application is available for use.

11. The machine-assisted method of claim 10, further comprising:

maintaining a database of gaming device parameters for a plurality of gaming devices;

identifying a gaining device for which new software is available;

retrieving from the database at least one parameter for the identified gaming device;

using the at least one parameter to determine whether downloading of the new software to the identified gaming device has been authorized; and if downloading of the new software to the identified gaming device has been authorized, downloading the new software to the gaining device in a background operation.

12. The machine-assisted method of claim 10, further comprising:

selecting at least one advertising criterion;

identifying a networked gaming device that meets the at least one advertising criterion;

authenticating an advertisement server; and downloading advertisement content from the advertisement server to the gaming device in a background operation while the gaming device is available for game playing.

13. The machine-assisted method of claim 10, further comprising:

obtaining authorization to download software to the gaming machine from a first server;

transferring the software download from a second server to the gaming device; and purging old software from the gaming device in background operation.

14. The machine-assisted method of claim 10 wherein software update information is stored on a first remote computer system, and further comprising, determining whether at least one new software is available for the gaming device includes referencing the software update information stored on the first remote computer system.

15. The machine-assisted method of claim 14 wherein authorization information is stored on a second remote computer system, and determining whether the new software has been authorized for download to the gaming device includes referencing the authorization information stored on the second remote computer system.

16. A gaming device comprising;

a computer system including a central processing unit coupled to a memory circuit, a display device, and a storage medium, the storage medium embodying instructions for running a gaming software application on the computer system that presents a game of chance, the application including an interface that is presented on the display device; and a network interface connected to a network;

wherein the central processing unit runs the gaming software application while new software is downloaded to the computer system at a time based on a predetermined on/off schedule that causes periodic shutdown of the gaming device at regular intervals, wherein the new software is fully downloaded to the computer system before a shutdown time determined from the periodic shutdown of the gaming device, and wherein the software is saved on the storage medium.

17. The gaming device of claim 16, wherein the gaming device includes a file system, capable of being defragmented.

18. The gaining device of claim 16, wherein new software includes content for advertising an event, product, or service.

19. The gaming device of claim 16, wherein new software includes game themes, game settings, bonus events, pay tables, program code, audio content, or video content.

* * * * *